US012698618B2

(12) United States Patent
Suzuki et al.

(10) Patent No.: US 12,698,618 B2
(45) Date of Patent: Aug. 4, 2026

(54) WORKING MACHINE

(71) Applicant: Yanmar Holdings Co., Ltd., Osaka (JP)

(72) Inventors: Shogo Suzuki, Fukuoka (JP); Daisuke Kawaguchi, Fukuoka (JP); Kazuki Tamura, Fukuoka (JP)

(73) Assignee: Yanmar Holdings Co., Ltd., Osaka (JP)

( * ) Notice: Subject to any disclaimer, the term of this patent is extended or adjusted under 35 U.S.C. 154(b) by 114 days.

(21) Appl. No.: 18/018,580

(22) PCT Filed: Aug. 5, 2021

(86) PCT No.: PCT/JP2021/029099
§ 371 (c)(1),
(2) Date: Jan. 30, 2023

(87) PCT Pub. No.: WO2022/030576
PCT Pub. Date: Feb. 10, 2022

(65) Prior Publication Data
US 2023/0304263 A1      Sep. 28, 2023

(30) Foreign Application Priority Data
Aug. 5, 2020      (JP) ................................. 2020-133138

(51) Int. Cl.
*E02F 9/26*          (2006.01)
*B60K 35/00*      (2024.01)
(Continued)

(52) U.S. Cl.
CPC ................ *E02F 9/26* (2013.01); *B60K 35/10* (2024.01); *B60K 35/22* (2024.01); *B60K 35/28* (2024.01);
(Continued)

(58) Field of Classification Search
CPC ........ E02F 9/262; E02F 9/2033; B60K 35/29; B60K 35/28; G05B 23/0272; G05B 23/0283
See application file for complete search history.

(56) References Cited

U.S. PATENT DOCUMENTS

2008/0140435 A1* 6/2008 Arakawa ................. E02F 9/267
                                                              705/1.1
2014/0236418 A1* 8/2014 Koga ................. G05B 23/0272
                                                              701/31.6
(Continued)

FOREIGN PATENT DOCUMENTS

JP          2005065307 A        3/2005
JP          2012072653 A        4/2012

*Primary Examiner* — Mirza F Alam
(74) *Attorney, Agent, or Firm* — Chris Mizumoto

(57) ABSTRACT
A working machine includes a display unit, a reception unit, and a display processing unit. The display unit displays a first screen that displays a first mark indicating a set function and a second screen for setting the function. The reception unit receives an instruction of setting a function when the display unit displays the second screen. In response to reception of the instruction of setting the function by the reception unit, when the display unit displays the second screen, the display processing unit causes the display unit to display a second mark corresponding to the first mark and superimposes the second mark on the second screen.

11 Claims, 17 Drawing Sheets

(51) Int. Cl.
| | |
|---|---|
| *B60K 35/10* | (2024.01) |
| *B60K 35/22* | (2024.01) |
| *B60K 35/28* | (2024.01) |
| *B60K 35/29* | (2024.01) |
| *B60K 35/60* | (2024.01) |
| *B60K 35/81* | (2024.01) |
| *B60W 50/14* | (2020.01) |

(52) U.S. Cl.
CPC .............. *B60K 35/29* (2024.01); *B60K 35/60* (2024.01); *B60K 35/81* (2024.01); *B60W 50/14* (2013.01); *B60K 2360/1876* (2024.01); *B60W 2050/146* (2013.01); *B60W 2300/17* (2013.01)

(56) References Cited

U.S. PATENT DOCUMENTS

| | | | | |
|---|---|---|---|---|
| 2016/0200252 A1* | 7/2016 | Oota | ...................... | B60T 8/17 348/148 |
| 2018/0091464 A1* | 3/2018 | Ohno | ...................... | G06F 13/00 |
| 2019/0360177 A1* | 11/2019 | Kiyota | ...................... | B60R 1/23 |
| 2022/0002979 A1* | 1/2022 | Sano | ...................... | E02F 9/267 |

* cited by examiner

WORKING MACHINE

CROSS-REFERENCE

This application is a US National Stage Application under 35 U.S.C. § 371 of International Application No. PCT/JP2021/029099 filed Aug. 5, 2021, which claims foreign priority of JP2020-133138 filed Aug. 5, 2020 and the disclosures of which are hereby incorporated by reference in their entirety.

TECHNICAL FIELD

The present invention relates to a working machine.

BACKGROUND ART

There is known a working machine that causes an operator to recognize a state of the working machine through a display device mounted on the working machine. For example, a construction machine of Patent Document 1 displays a state change display mark on a display device. Specifically, in the case in which the state of the construction machine changes, the display device displays a state change display mark at a specific display location on a display screen.

PRIOR ART DOCUMENT

Patent Document

Patent Document 1: JP-A-2012-72653

SUMMARY OF INVENTION

Technical Problem

However, the operator sometimes does not know the meaning of the mark displayed on the display device. Therefore, there is the case in which the operator fails to recognize the change in the state of the working machine only by displaying the mark.

The present invention has been made in view of the above problems, and an object of the present invention is to provide a working machine capable of allowing an operator to learn the meaning of a mark.

Solution to Problem

A working machine according to the present invention includes a display unit, a reception unit, and a display processing unit. The display unit displays a first screen that displays a first mark indicating a set function and a second screen that sets the function. The reception unit receives an instruction to set the function when the display unit displays the second screen. The display processing unit displays a second mark corresponding to the first mark on the display unit and superimposes the second mark on the second screen when the display unit displays the second screen in response to reception of the instruction to set the function by the reception unit.

Advantageous Effects of Invention

According to the present invention, it is possible to allow the operator to learn the meaning of the mark.

DESCRIPTION OF EMBODIMENTS

Figure 1:
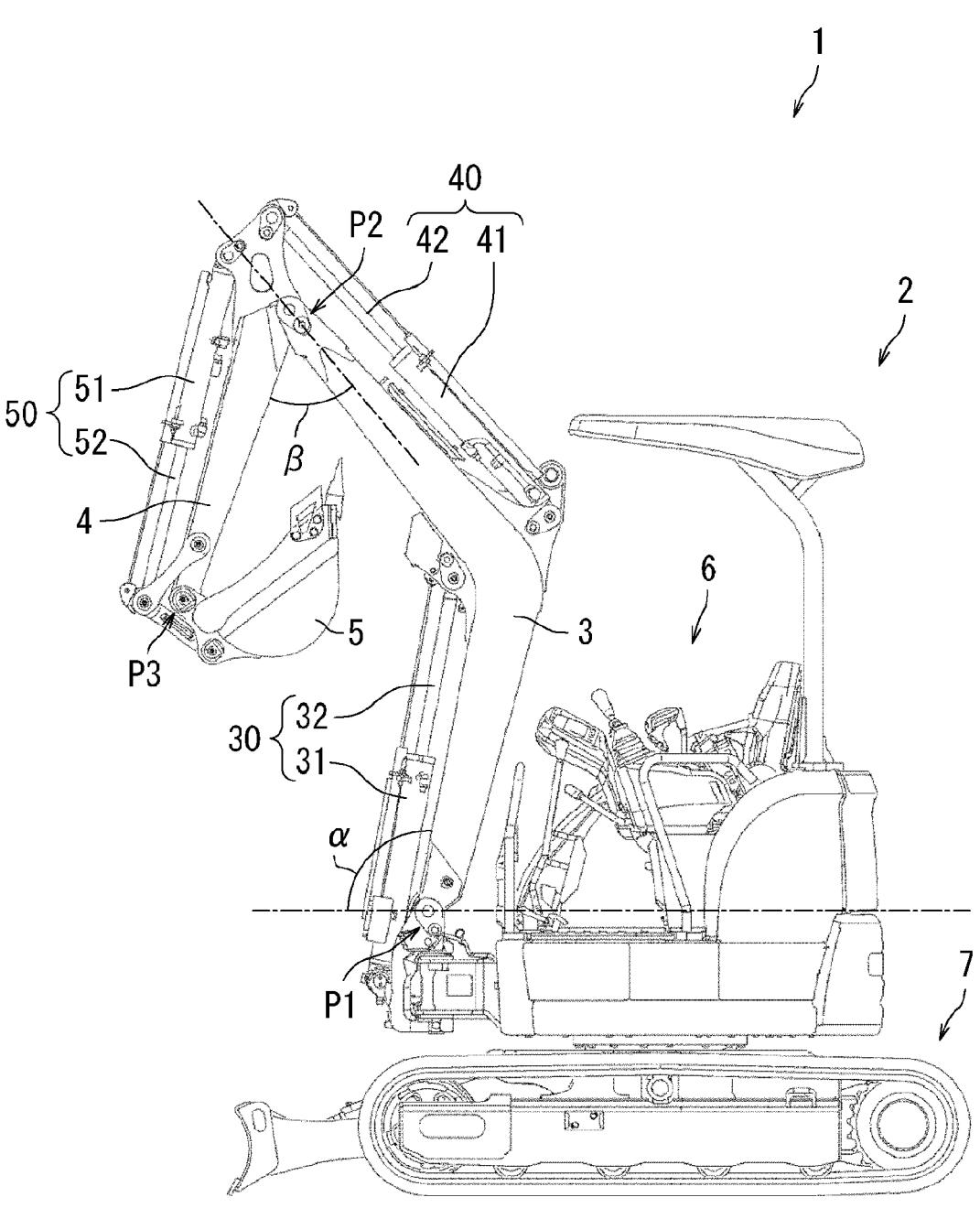
FIG. 1 is a side view of a working machine according to a first embodiment of the present invention.

In the following, embodiments according to a working machine of the present invention will be described with reference to the drawings (FIGS. 1 to 17). However, the present invention is not limited to the embodiments below. Note that the redundant description is sometimes appropriately omitted. In addition, in the drawings, the same or corresponding parts are designated with the same reference numerals, and the description will not be repeated.

First Embodiment

In the following, a first embodiment of the present invention will be described with reference to FIGS. 1 to 11. First, a working machine 1 according to the present embodiment will be described with reference to FIGS. 1 to 3. FIG. 1 is a side view of a working machine 1 according to a first embodiment of the present invention. As shown in FIG. 1, the working machine 1 of the present embodiment is a backhoe. The backhoe is a type of construction machine. The working machine 1 of the present embodiment includes a machine body 2, a boom 3, an arm 4, a bucket 5, and a traveling device 7. The working machine 1 of the present embodiment further includes a boom actuator 30, an arm actuator 40, and an attachment actuator 50.

The machine body 2 has a driver's seat 6. The operator sits on the driver's seat 6 and operates the working machine 1. The machine body 2 is supported by the traveling device 7. The machine body 2 may be rotatably supported by the traveling device 7. The machine body 2 is provided with an engine, a fuel tank, a battery, a hydraulic system, and a hydraulic oil tank. In addition, the machine body 2 is provided with a hood that houses the engine, the fuel tank, the battery, the hydraulic system, and the hydraulic oil tank, and the driver's seat 6 is disposed on the hood.

The boom 3 is swingably supported by the machine body 2 about a first rotation supporting point P1. Specifically, the proximal end part of the boom 3 is pivotally supported by the machine body 2. The first rotation supporting point P1 is a rotation axis extending along a left-right direction when the driver's seat 6 is viewed from the front. In the following, the left-right direction when the driver's seat 6 is viewed from the front is sometimes referred to as a "left-right direction".

The boom actuator 30 operates the boom 3. Specifically, the boom actuator 30 swings the boom 3 about the first rotation supporting point P1. Therefore, the boom actuator 30 adjusts an angle $\alpha$ of the boom 3 to a horizontal plane. As a result, the height of the boom 3 to the horizontal plane is adjusted.

The boom actuator 30 includes a boom cylinder 31 and a boom piston 32. The boom cylinder 31 moves the boom piston 32 forward and backward with hydraulic oil. Therefore, the boom actuator 30 expands and contracts with the hydraulic oil. When the boom actuator 30 expands and contracts, the boom 3 swings about the first rotation supporting point P1.

The arm 4 is swingably supported by the boom 3 about a second rotation supporting point P2. Specifically, the proximal end part of the arm 4 is pivotally supported at the distal end part of the boom 3. The second rotation supporting point P2 is a rotation axis extending along the left-right direction.

The arm actuator 40 operates the arm 4. Specifically, the arm actuator 40 swings the arm 4 about the second rotation supporting point P2. Therefore, the arm actuator 40 adjusts an angle $\beta$ of the arm 4 to the boom 3. As a result, the position (distance) of bucket 5 (attachment) to boom 3 and machine body 2 is adjusted.

The arm actuator 40 includes an arm cylinder 41 and an arm piston 42. The arm cylinder 41 moves the arm piston 42 forward and backward with hydraulic oil. Therefore, the arm actuator 40 expands and contracts with the hydraulic oil. When the arm actuator 40 expands and contracts, the arm 4 swings about the second rotation supporting point P2.

The bucket 5 is a type of attachment. The bucket 5 is swingably supported by the arm 4 about a third rotation supporting point P3. Specifically, the bucket 5 is pivotally supported at the distal end part of the arm 4. The third rotation supporting point P3 is a rotation axis extending along the left-right direction.

The attachment actuator 50 operates the bucket 5. Specifically, the attachment actuator 50 swings the bucket 5 about the third rotation supporting point P3.

The attachment actuator 50 includes an attachment cylinder 51 and an attachment piston 52. The attachment cylinder 51 moves the attachment piston 52 forward and backward with hydraulic oil. Therefore, the attachment actuator 50 expands and contracts with the hydraulic oil. When the attachment actuator 50 expands and contracts, the bucket 5 swings about the third rotation supporting point P3. Note that in the working machine 1, the attachment is replaceable. For example, the bucket 5 can be replaced with a hydraulic breaker.

The traveling device 7 causes the working machine 1 to travel. In the present embodiment, the traveling device 7 is a crawler traveling device.

Figure 2:
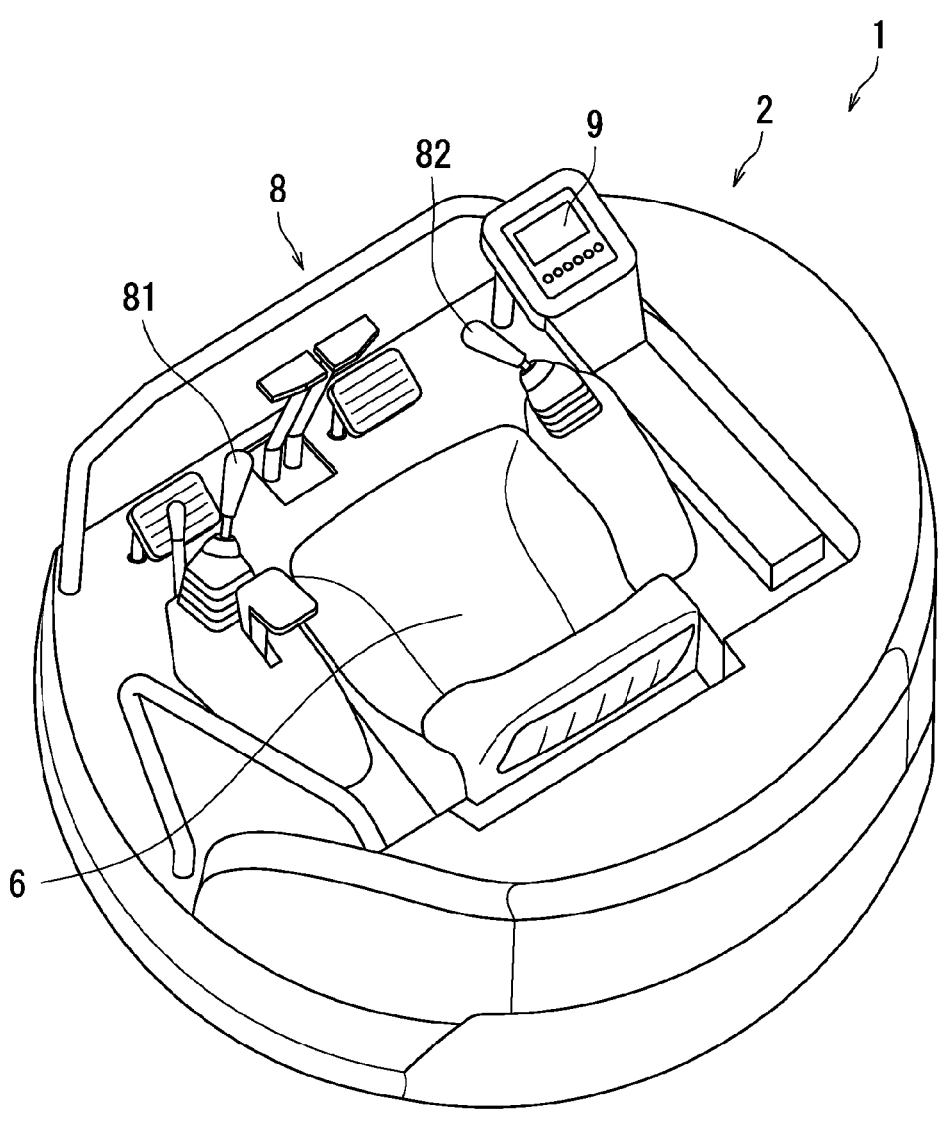
FIG. 2 is a perspective view of a machine body in the working machine.

Next, the configuration of the working machine 1 will be further described with reference to FIGS. 1 and 2. Specifically, a configuration around the driver's seat 6 will be described. FIG. 2 is a perspective view of the machine body 2 in the working machine 1.

As shown in FIG. 2, the working machine 1 further includes a steering unit 8 and a display device 9. The steering unit 8 and the display device 9 are provided in the machine body 2. Specifically, the steering unit 8 and the display device 9 are disposed in front of the driver's seat 6.

The steering unit 8 includes various operation members for an operator to operate the working machine 1. The various operation members include an arm operation lever 81 and a boom operation lever 82.

The operator can operate the arm 4 by operating the arm operation lever 81. Specifically, as described with reference to FIG. 1, the operator can adjust the angle $\beta$ of the arm 4 to the boom 3 by operating the arm operation lever 81. Therefore, the operator can adjust the position (distance) of the attachment to the boom 3 and the machine body 2 by operating the arm operation lever 81. In the following, the angle $\beta$ of the arm 4 to the boom 3 is sometimes referred to as an "angle $\beta$ of the arm 4".

The operator can operate the boom 3 by operating the boom operation lever 82. Specifically, as described with reference to FIG. 1, the operator can adjust the angle $\alpha$ of the boom 3 to the horizontal plane by operating the boom operation lever 82. Therefore, the operator can adjust the height of the boom 3 to the horizontal plane by operating the boom operation lever 82. In the following, the angle $\alpha$ of the boom 3 to the horizontal plane is sometimes referred to as "the angle $\alpha$ of the boom 3". In addition, the height of the boom 3 to the horizontal plane is sometimes referred to as "the height of the boom 3".

The display device 9 displays various screens. Specifically, as will be described later with reference to FIG. 4, FIG. 5, and the like, the display device 9 displays a home screen 510 and a guidance screen 520.

Figure 3:
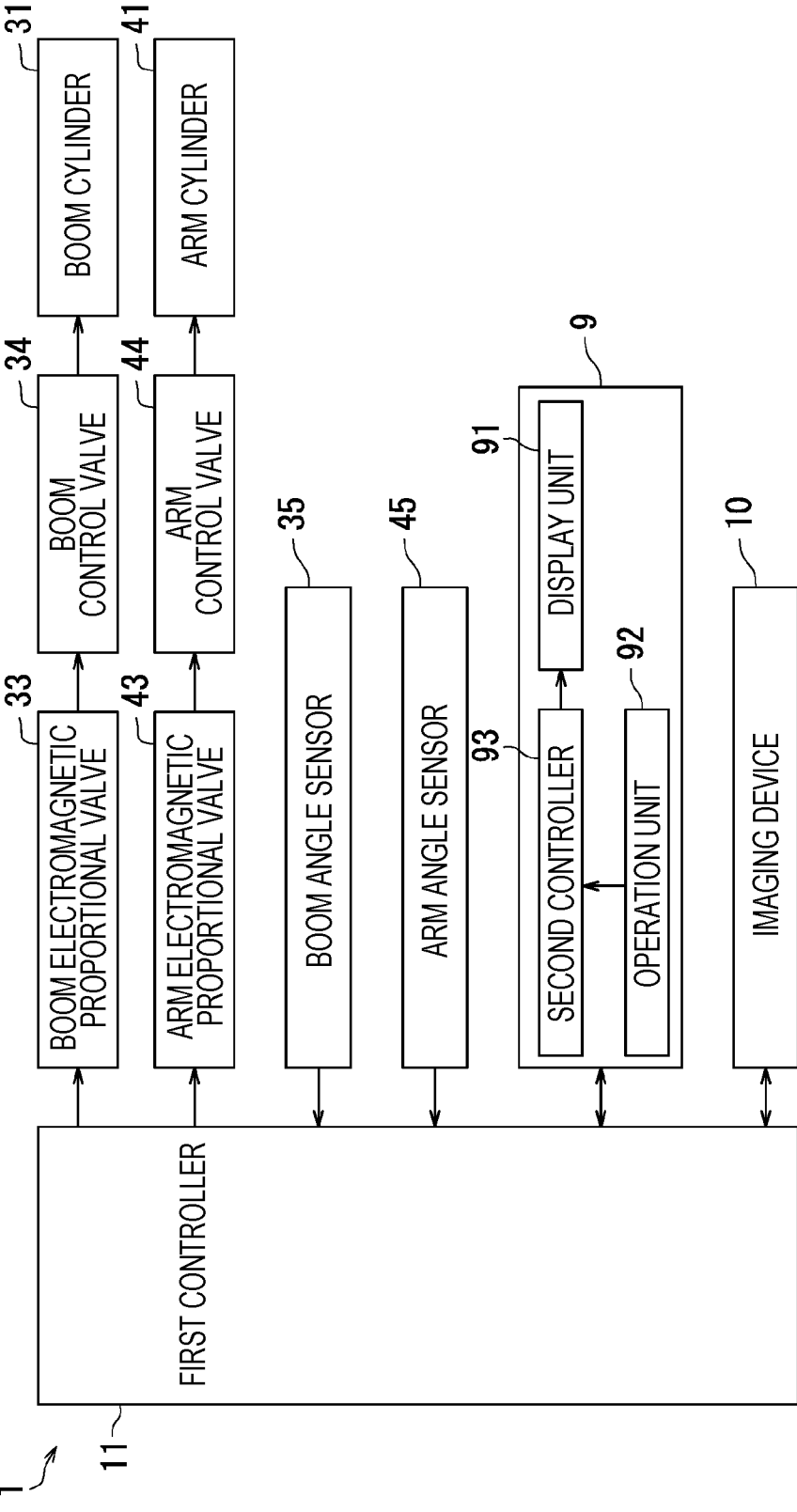
FIG. 3 is a block diagram of the working machine.

Next, the configuration of the working machine 1 of the present embodiment will be further described with reference to FIGS. 1 to 3. FIG. 3 is a block diagram of the working machine 1. As shown in FIG. 3, the working machine 1 further includes an imaging device 10, a first controller 11, a boom electromagnetic proportional valve 33, a boom control valve 34, a boom angle sensor 35, an arm electromagnetic proportional valve 43, an arm control valve 44, and an arm angle sensor 45.

The boom control valve 34 controls the supply of the hydraulic oil to the boom cylinder 31, the stop of the supply of the hydraulic oil to the boom cylinder 31, and the discharge of the hydraulic oil from the boom cylinder 31 in response to the operation of the operator on the boom operation lever 82 described with reference to FIG. 2. Therefore, the operator can adjust the angle $\alpha$ of the boom 3 by operating the boom operation lever 82. In other words, the operator can adjust the height of the boom 3 by operating the boom operation lever 82.

The boom electromagnetic proportional valve 33 is controlled by the first controller 11 to increase or decrease a change rate (supply amount per unit time) of the supply amount of the hydraulic oil supplied from the boom control valve 34 to the boom cylinder 31.

The arm control valve 44 controls the supply of the hydraulic oil to the arm cylinder 41, the stop of the supply of the hydraulic oil to the arm cylinder 41, and the discharge of the hydraulic oil from the arm cylinder 41 in response to the operation of the operator on the arm operation lever 81 described with reference to FIG. 2. Therefore, the operator can adjust the angle β of the arm 4 by operating the arm operation lever 81. In other words, the operator can adjust the position of the arm 4 by operating the arm operation lever 81.

The arm electromagnetic proportional valve 43 is controlled by the first controller 11 to increase or decrease a change rate (supply amount per unit time) of the supply amount of the hydraulic oil supplied from the arm control valve 44 to the arm cylinder 41.

The boom angle sensor 35 detects the angle α of the boom 3. The first controller 11 stores the angle α of the boom 3 detected by the boom angle sensor 35 when the function of restricting the height of the boom 3 is set. The function of restricting the height of the boom 3 is provided to avoid interference of the boom 3 with an obstacle (e.g., a structure such as a ceiling) above the working machine 1. Note that in the following description, the function of restricting the height of the boom 3 is sometimes referred to as a "boom height restriction function".

The arm angle sensor 45 detects the angle β of the arm 4. The first controller 11 stores the angle β of the arm 4 detected by the arm angle sensor 45 when the function of restricting the position of the arm 4 is set. In the following, the function of restricting the position of the arm 4 is sometimes referred to as an "arm position restriction function".

Note that the function of restricting the position of the arm 4 is provided to avoid interference of the attachment with the boom 3 and the machine body 2. For example, since the hydraulic breaker is longer than bucket 5, replacing the attachment from bucket 5 to the hydraulic breaker may cause the hydraulic breaker to interfere with the boom 3 and the machine body 2. Therefore, the position of the arm 4 may be restricted after replacing the attachment from the bucket 5 with the hydraulic breaker.

The imaging device 10 is controlled by the first controller 11 to capture an image of an environment around the working machine 1. An image (video) captured by the imaging device 10 is displayed on the display device 9.

The first controller 11 controls the components of the working machine 1. The first controller 11 includes, for example, a processing unit that executes various processes, a storage unit that stores various programs and various pieces of data, and an input/output interface. The processing unit includes, for example, a processor that executes various operations such as a central processing unit (CPU) or a micro processing unit (MPU). Alternatively, the processing unit may be constituted of a general-purpose computing device. The storage unit includes, for example, a semiconductor memory. The storage unit includes, for example, a random access memory (RAM) and a read only memory (ROM). The storage unit may further include a non-volatile memory such as an EEPROM (registered trademark) or a flash memory. The first controller 11 includes, for example, an electronic control unit (ECU).

In the present embodiment, when the boom height restriction function is set, the first controller 11 restricts the height of the boom 3. Similarly, when the arm position restriction function is set, the first controller 11 restricts the position of the arm 4. The operator can set the boom height restriction function and the arm position restriction function through the display device 9. Restricting the height of the boom 3 is an example of changing the state of the working machine 1. Similarly, restricting the position of the arm 4 is an example of changing the state of the working machine 1.

The display device 9 includes a display unit 91, an operation unit 92, and a second controller 93. The display unit 91 includes, for example, a display such as a liquid crystal display or an organic EL display. The operation unit 92 is operated by an operator to receive various instructions. The operator can operate the operation unit 92 to input various instructions to the second controller 93. The operation unit 92 is an example of a reception unit.

The second controller 93 causes the display unit 91 to display various screens based on various types of pieces of information transmitted from the first controller 11. The second controller 93 includes, for example, a processing unit that executes various processes, a storage unit that stores various programs and various pieces of data, and an input/output interface. The second controller 93 includes, for example, an ECU. The second controller 93 is an example of a display processing unit.

Figure 4:
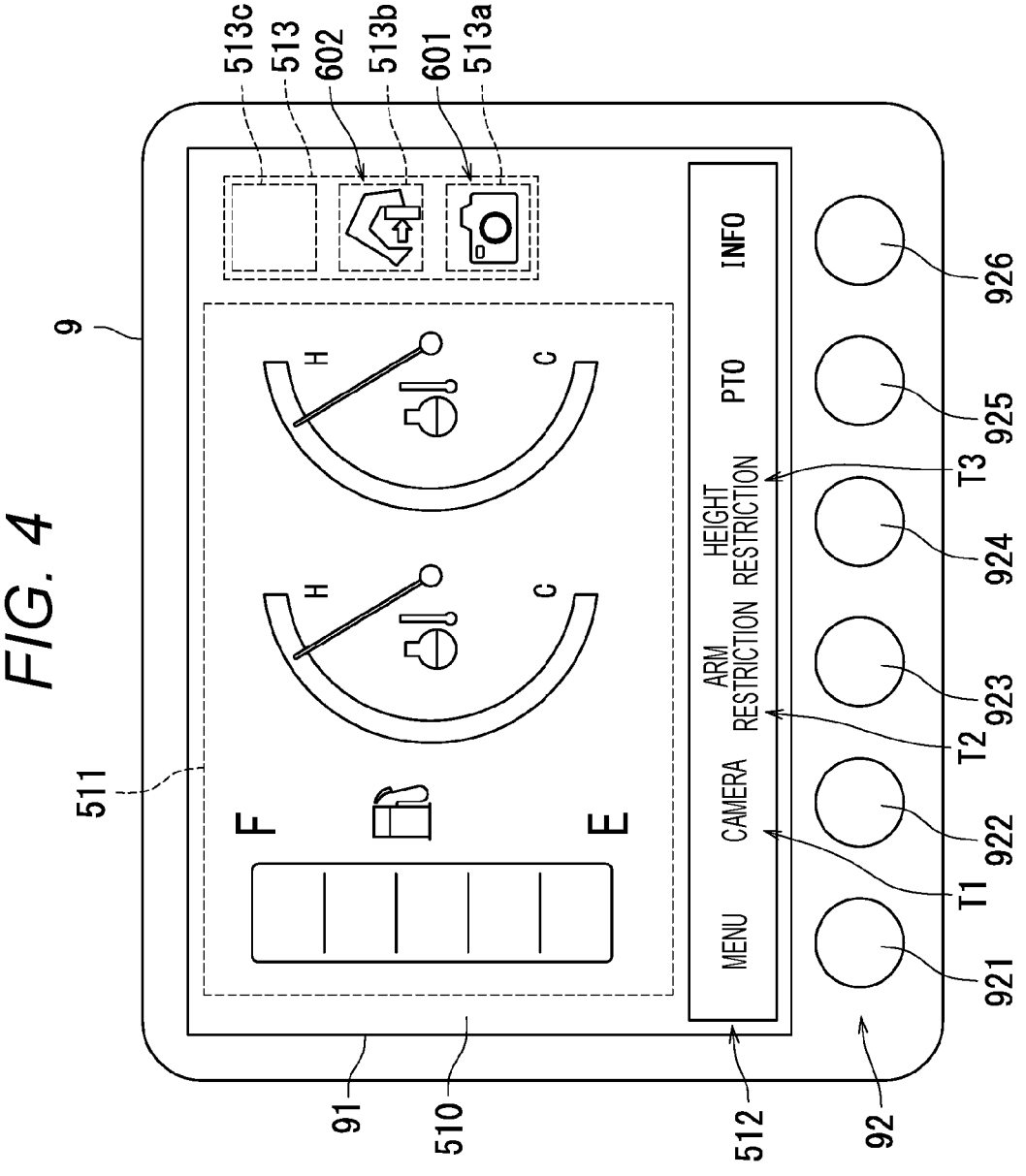
FIG. 4 is a diagram showing a display device in the working machine.

Next, the display device 9 will be further described with reference to FIGS. 1 to 9. FIG. 4 is a diagram showing the display device 9 in the working machine 1. Specifically, FIG. 4 shows the display device 9 displaying the home screen 510.

As shown in FIG. 4, the display unit 91 displays the home screen 510. The home screen 510 is an example of a first screen. The home screen 510 includes a main display area 511, a first selection item display area 512, and a setting function display area 513.

The main display area 511 displays, for example, a fuel remaining amount gauge, a cooling water temperature gauge, and a hydraulic oil temperature gauge. Specifically, the main display area 511 displays the fuel remaining amount gauge, the cooling water temperature gauge, and the hydraulic oil temperature gauge when the engine is started. The first selection item display area 512 displays various selection items. Specifically, a character image (character string image) indicating various selection items is displayed in the first selection item display area 512.

In the present embodiment, the operation unit 92 includes a plurality of operation switches. Specifically, the operation unit 92 includes a first operation switch 921 to a sixth operation switch 926. The first operation switch 921 to the sixth operation switch 926 correspond to the selection items displayed in the first selection item display area 512 on a one-to-one basis. In the case in which the display unit 91 displays the home screen 510, a function of selecting a corresponding one from the selection items displayed in the first selection item display area 512 is allocated to the first operation switch 921 to the sixth operation switch 926.

For example, a function of selecting a selection item T1 "camera" is allocated to the second operation switch 922. When the operator presses the second operation switch 922, the second controller 93 displays an image (video) captured by the imaging device 10 in the main display area 511. When the operator presses the second operation switch 922 again, the second controller 93 causes the main display area 511 to display the fuel remaining amount gauge, the cooling water temperature gauge, and the hydraulic oil temperature gauge.

When the working machine 1 is traveling, an image (video) captured by the imaging device 10 is displayed in the main display area 511. In addition, even when the working machine 1 is executing work, an image (video) captured by the imaging device 10 is displayed in the main display area 511.

In the present embodiment, the selection items displayed in the first selection item display area 512 include items that set the function of the working machine 1. Specifically, the selection items include a selection item T2 "arm restriction" and a selection item T3 "height restriction". The selection item T2 "arm restriction" is an item that sets the arm position restriction function. The selection item T3 "height restriction" is an item that sets the boom height restriction function.

In the case in which the display unit 91 displays the home screen 510, the function of selecting the selection item T2 "arm restriction" is allocated to the third operation switch 923. When the operator presses the third operation switch 923, the second controller 93 causes the display unit 91 to display a guidance screen that sets the arm position restriction function. The operator can arbitrarily set the arm position restriction function.

In the case in which the display unit 91 displays the home screen 510, the function of selecting the selection item T3 "height restriction" is allocated to the fourth operation switch 924. When the operator presses the fourth operation switch 924, the second controller 93 causes the display unit 91 to display the guidance screen 520 described later with reference to FIG. 5. The guidance screen 520 is a screen that sets the boom height restriction function. The operator can arbitrarily set the boom height restriction function.

The setting function display area 513 displays a mark indicating the function set in the working machine 1. Therefore, the home screen 510 displays a mark indicating the function set in the working machine 1. The mark is, for example, an icon, a figure, or an emoticon. In the present embodiment, the setting function display area 513 includes a first mark display area 513a, a second mark display area 513b, and a third mark display area 513c. Note that the mark displayed in the setting function display area 513 may be lit or may blink. In addition, in the case in which the display unit 91 is a color display, the mark may be colored.

In the case in which the camera function is set, the first functional mark 601 is displayed in the first mark display area 513a. The first functional mark 601 indicates that the camera function is set. Specifically, the first functional mark 601 indicates that the imaging device 10 is in operation.

In the case in which the arm position restriction function is set, the second functional mark 602 is displayed in the second mark display area 513b. The second functional mark 602 indicates that the arm position restriction function is set.

In the case in which the boom height restriction function is set, a third functional mark 603 described with reference to FIG. 7 and the like is displayed in the third mark display area 513c. The third functional mark 603 indicates that the boom height restriction function is set. The third functional mark 603 is an example of the first mark. Note that FIG. 4 shows the home screen 510 displayed on the display unit 91 in the case in which the boom height restriction function is not set. Therefore, the third functional mark 603 is not displayed in the third mark display area 513c.

Figure 5:
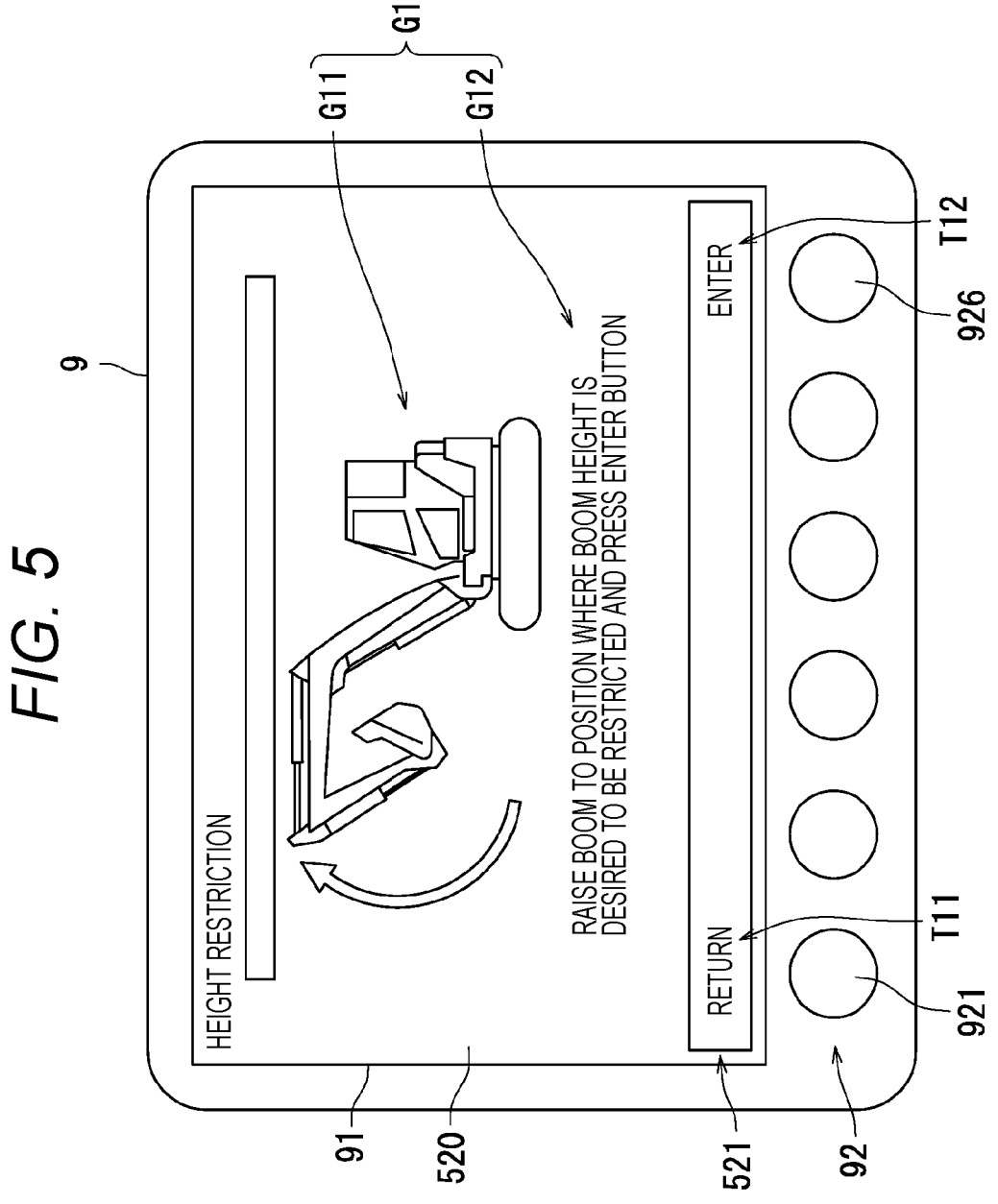
FIG. 5 is a diagram showing the display device displaying a guidance screen.

Next, the display device 9 will be further described with reference to FIGS. 1 to 5. FIG. 5 is a diagram showing the display device 9 displaying the guidance screen 520. As described with reference to FIG. 4, when the operator presses the fourth operation switch 924 while the display unit 91 is displaying the home screen 510, the second controller 93 causes the display unit 91 to display the guidance screen 520. When the display unit 91 displays the guidance screen 520, the operation unit 92 receives an instruction to set the boom height restriction function. The instruction to set the boom height restriction function is an example of an instruction to set the function, and the guidance screen 520 is an example of a second screen.

As shown in FIG. 5, the guidance screen 520 displays a first guidance image G1. The first guidance image G1 is an image that guides the operator to perform an operation of restricting the height of the boom 3. The first guidance image G1 includes, for example, an object image G11 and a message image G12.

The object image G11 is an image that visually guides the operator to perform an operation of restricting the height of the boom 3. For example, the object image G11 is a figure or an emoticon. The message image G12 is a character string image indicating an operation of restricting the height of the boom 3. The operator can set the boom height restriction function by operating the working machine 1 according to the guidance with the first guidance image G1.

As shown in FIG. 5, the guidance screen 520 has a second selection item display area 521. The second selection item display area 521 displays various selection items. Specifically, a character image (character string image) indicating various selection items is displayed in the second selection item display area 521. In the present embodiment, a selection item T11 "return" and a selection item T12 "enter" are displayed in the second selection item display area 521. The selection item T11 "return" is an item selected when returning to the home screen 510 without setting the boom height restriction function. The selection item T12 "enter" is an item selected when the boom height restriction function is set.

In the case in which the display unit 91 displays the guidance screen 520, a function of selecting the selection item T11 "return" is allocated to the first operation switch 921. When the operator presses the first operation switch 921, the second controller 93 causes the display unit 91 to display the home screen 510.

In the case in which the display unit 91 displays the guidance screen 520, a function of selecting the selection item T12 "enter" is allocated to the sixth operation switch 926. When the operator presses the sixth operation switch 926, the boom height restriction function is set. As a result, the height (maximum height) of the boom 3 is restricted.

Here, an operation performed by the operator when setting the boom height restriction function and a process executed by the first controller 11 in response to the operation will be described. The operator can set the boom height restriction function while the guidance screen 520 is displayed. Specifically, when setting the boom height restriction function, the operator operates the boom operation lever 82 to raise the boom 3 to a position (upper limit position) at which the height of the boom 3 is to be restricted. Next, the operator presses the sixth operation switch 926. As a result, the height (maximum height) of the boom 3 is restricted at the upper limit position.

When the operator presses the sixth operation switch 926, the second controller 93 outputs, to the first controller 11, a signal indicating that the sixth operation switch 926 is pressed. The first controller 11 stores the angle $\alpha$ of the boom 3 detected by the boom angle sensor 35 when receiving the signal indicating that the sixth operation switch 926 is pressed. This angle $\alpha$ (in the following, described as "a limit angle $\alpha 1$") corresponds to the upper limit position of the boom 3. In the following, the first controller 11 controls the hydraulic system of the hydraulic oil based on the boom angle sensor 35 such that the angle α of the boom 3 does not exceed the restricting angle α1 until the boom height restriction function is released.

Figure 6:
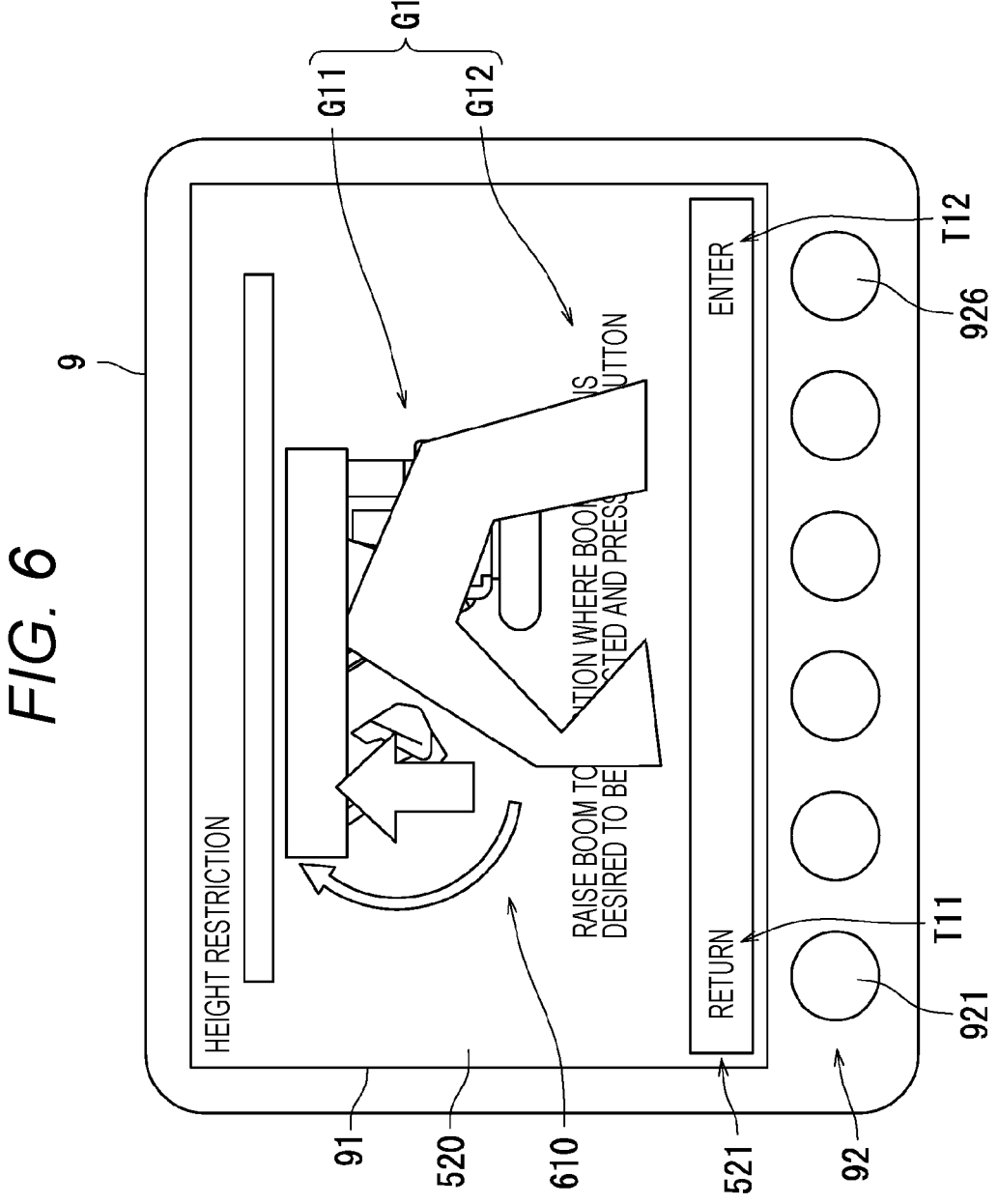
FIG. 6 is a diagram showing the display device after an operation unit receives an instruction to set a boom height restriction function.

Next, the display device 9 will be further described with reference to FIGS. 1 to 6. FIG. 6 is a diagram showing the display device 9 after the operation unit 92 receives an instruction to set the boom height restriction function. In other words, FIG. 6 shows the display device 9 after the operator presses the sixth operation switch 926.

As shown in FIG. 6, the second controller 93 causes the display unit 91 to display the first training mark image 610 in response to the reception of an instruction to set the boom height restriction function by the operation unit 92, and superimposes the first training mark image 610 on the guidance screen 520. That is, the second controller 93 superimposes the first training mark image 610 on the guidance screen 520 in response to pressing the sixth operation switch 926 by the operator. In the present embodiment, the first training mark image 610 is superimposed on the center of the guidance screen 520.

The first training mark image 610 corresponds to the third functional mark 603 described later with reference to FIG. 7. Specifically, the first training mark image 610 indicates a mark that enlarges the third functional mark 603. The first training mark image 610 is an example of a second mark.

Subsequently, the display device 9 will be further described with reference to FIGS. 1 to 7. FIG. 7 is a diagram showing the display device 9 after an elapse of a certain period of time from the display of the first training mark image 610 on the display unit 91.

Figure 7:
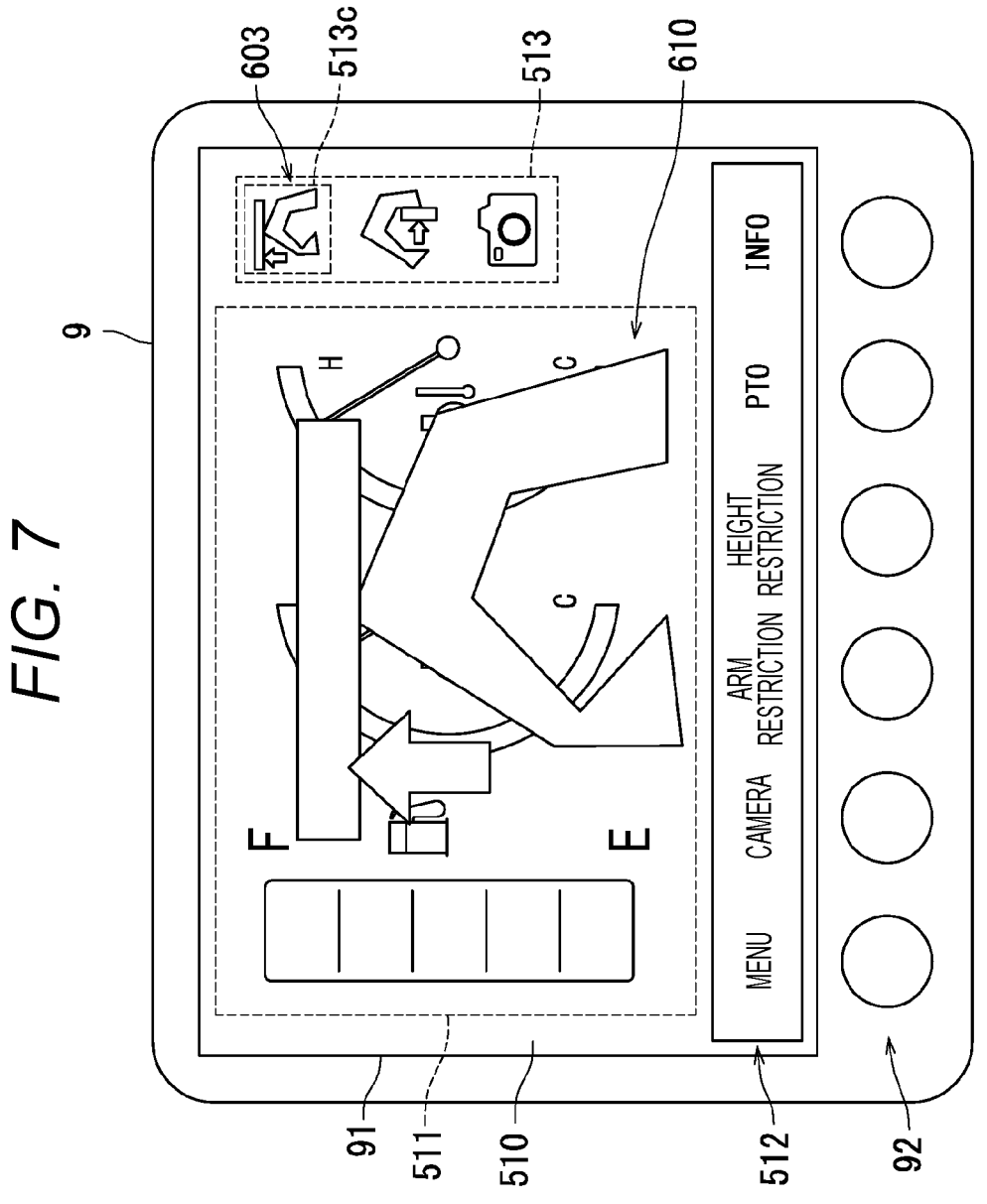
FIG. 7 is a diagram showing the display device after an elapse of a certain period of time from the display of a first training mark image on the display unit.

As shown in FIG. 7, after superimposing the first training mark image 610 on the guidance screen 520, the second controller 93 causes the display unit 91 to display the home screen 510 instead of the guidance screen 520 while causing the display unit 91 to display the first training mark image 610. In other words, the second controller 93 causes the screen displayed on the display unit 91 to transition from the guidance screen 520 to the home screen 510. As a result, the first training mark image 610 is superimposed on the home screen 510. In the present embodiment, the first training mark image 610 is superimposed on the center of the home screen 510. Specifically, the first training mark image 610 is superimposed on the main display area 511.

In addition, the second controller 93 executes a setting notification process when causing the display unit 91 to display the home screen 510 instead of the guidance screen 520. The setting notification process is a process of notifying on the home screen 510 that the boom height restriction function is set.

In the present embodiment, the setting notification process is a process of displaying the third functional mark 603 on the home screen 510. Specifically, the third functional mark 603 is displayed in the third mark display area 513c. Note that the first training mark image 610 is superimposed on the main display area 511. Therefore, the first training mark image 610 is displayed in an area that does not overlap with the third functional mark 603 (third mark display area 513c).

Figure 8:
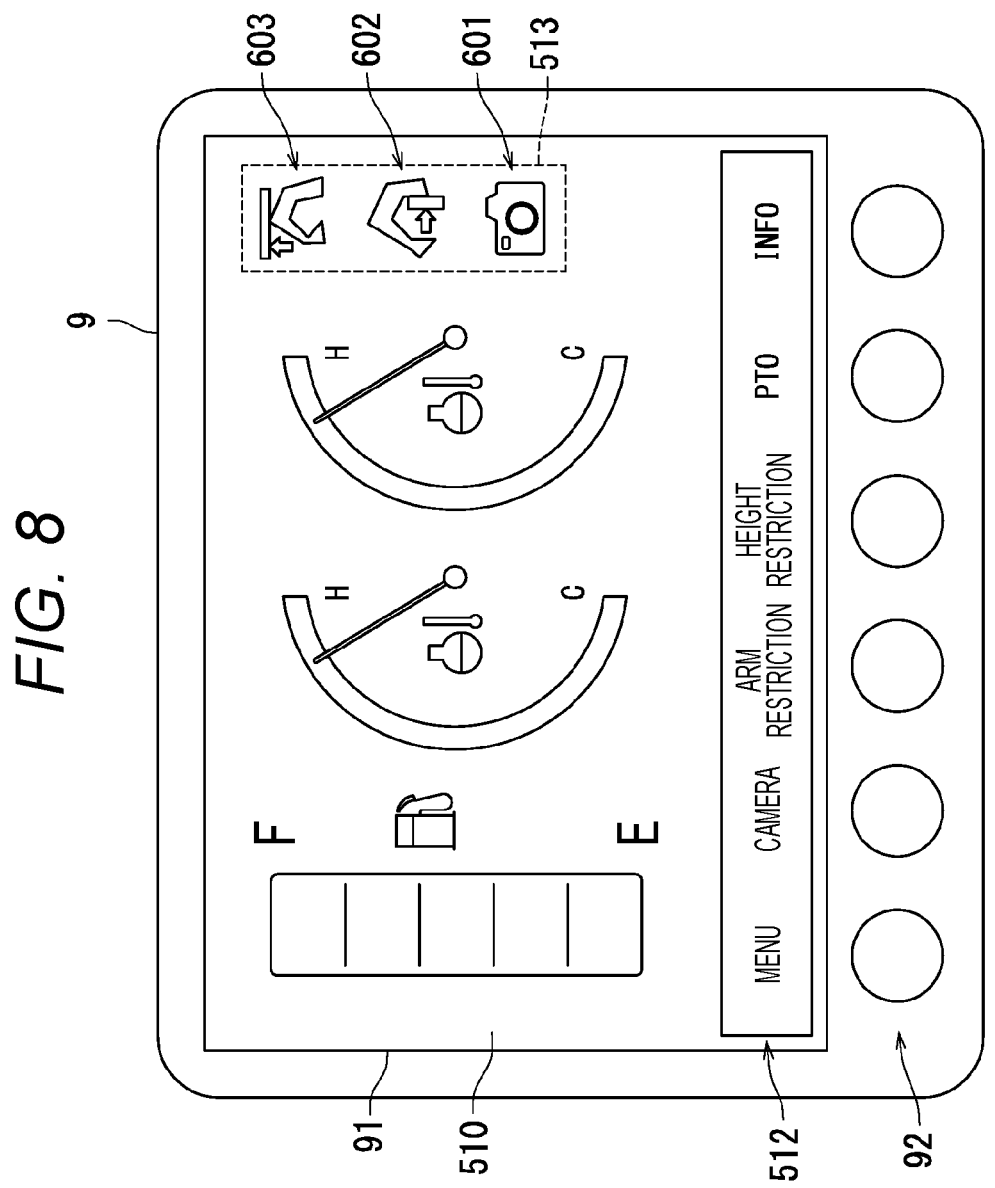
FIG. 8 is a diagram showing the display device after an elapse of a certain period of time from the superposition of the first training mark image on the home screen.

Subsequently, the display device 9 will be further described with reference to FIGS. 1 to 8. FIG. 8 is a diagram showing the display device 9 after an elapse of a certain period of time from the superposition of the first training mark image 610 on the home screen 510.

As shown in FIG. 8, the second controller 93 erases the first training mark image 610 from the display unit 91 after an elapse of a certain period of time from the superposition of the first training mark image 610 on the home screen 510. In other words, the second controller 93 erases the first training mark image 610 from the display unit 91 after an elapse of a certain period of time from the transition of the screen displayed on the display unit 91 from the guidance screen 520 to the home screen 510. As a result, the home screen 510 is turned into a normal state.

Figure 9:
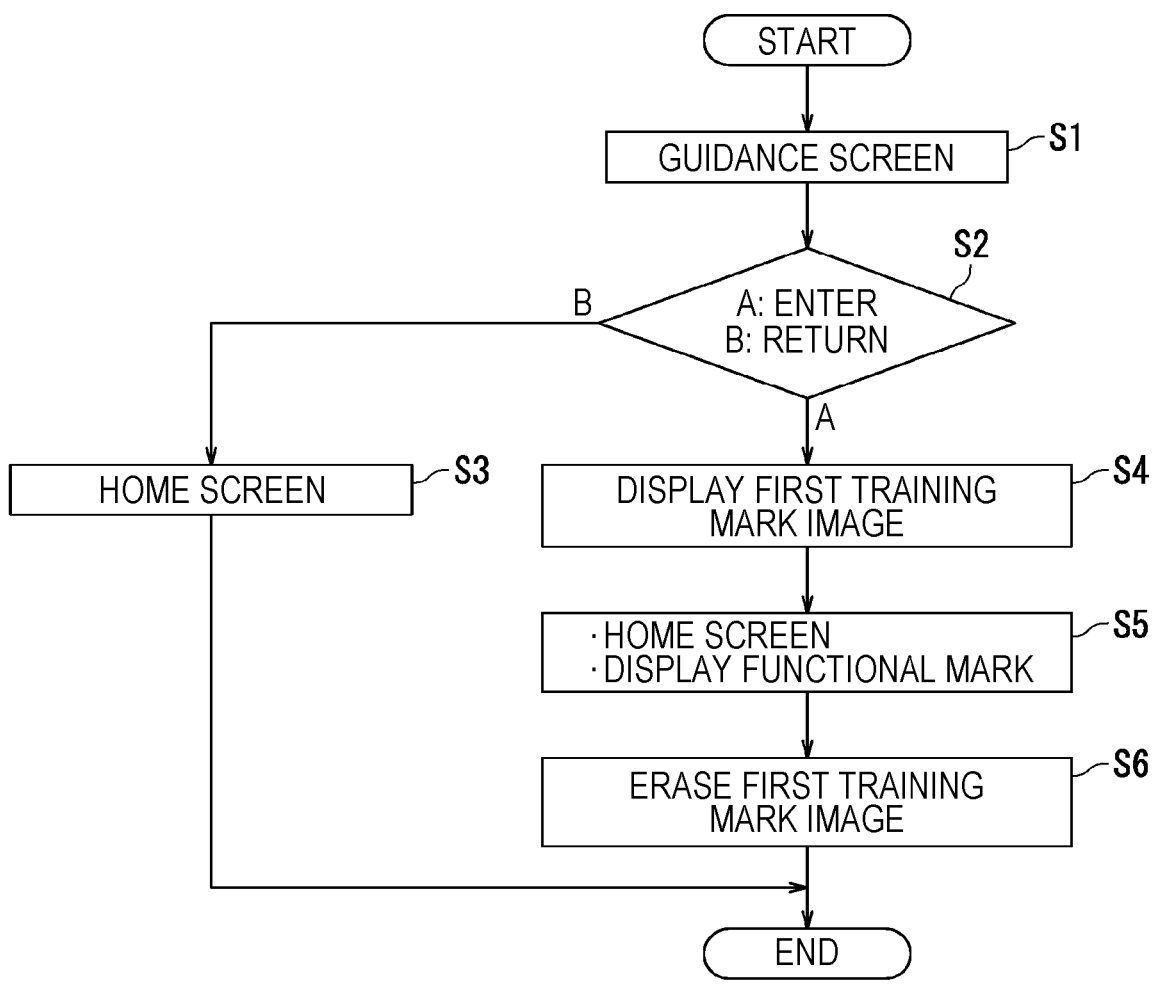
FIG. 9 is a flowchart showing a process executed by a second controller in the working machine.

Next, a process executed by the second controller 93 will be described with reference to FIGS. 1 to 9. FIG. 9 is a flowchart showing the process executed by the second controller 93 in the working machine 1. Specifically, FIG. 9 shows a process executed by the second controller 93 in response to selection of the selection item T3 "height restriction" while the home screen 510 is displayed. That is, FIG. 9 shows the process executed by the second controller 93 in response to pressing of the fourth operation switch 924 while the home screen 510 is displayed on the display unit 91.

As shown in FIG. 9, when the fourth operation switch 924 is pressed while the home screen 510 is displayed on the display unit 91, the second controller 93 causes the display unit 91 to display the guidance screen 520 (Step S1).

After displaying the guidance screen 520 on the display unit 91, the second controller 93 waits until the operator selects one of the selection item T11 "return" and the selection item T12 "enter" (Step S2).

When the operator presses the first operation switch 921 to select the selection item T11 "return" (B in Step S2), the second controller 93 causes the display unit 91 to display the home screen 510 (Step S3), and ends the process shown in FIG. 9.

When the operator presses the sixth operation switch 926 to select the selection item T12 "enter" (A in Step S2), the second controller 93 executes a series of processes from Step S4 to Step S6. That is, the second controller 93 executes a series of processes from Step S4 to Step S6 in response to the instruction to set the boom height restriction function received by the operation unit 92.

Specifically, the second controller 93 causes the display unit 91 to display the first training mark image 610 and superimposes the first training mark image 610 on the guidance screen 520 in response to the reception of an instruction to set the boom height restriction function by the operation unit 92 (Step S4).

Subsequently, the second controller 93 causes the display unit 91 to display the home screen 510 instead of the guidance screen 520 while displaying the first training mark image 610, and superimposes the first training mark image 610 on the home screen 510 (Step S5). Furthermore, the second controller 93 displays the third functional mark 603 in the third mark display area 513c (Step S5).

Subsequently, after an elapse of a certain period of time from the superposition of the first training mark image 610 on the home screen 510, the second controller 93 erases the first training mark image 610 from the display unit 91 (Step S6), and ends the process shown in FIG. 9.

As described above with reference to FIGS. 1 to 9, according to the present embodiment, the first training mark image 610 is superimposed on the guidance screen 520. Specifically, when the operator sets the function of restricting the height of the boom 3 following the guidance screen 520, the first training mark image 610 is superimposed on the guidance screen 520. Since the first training mark image 610 corresponds to the third functional mark 603, it is possible to allow the operator to learn the meaning of the third functional mark 603. That is, it is possible to allow the operator to learn which function of the working machine 1 the third functional mark 603 represents.

Furthermore, according to the present embodiment, even after the screen displayed on the display unit 91 transitions from the guidance screen 520 to the home screen 510, the first training mark image 610 can be superimposed on the home screen 510 for a certain period of time. Therefore, since it is possible to allow the operator to visually recognize the first training mark image 610 for a longer time, it is possible to enhance the learning effect.

In addition, according to the present embodiment, when the first training mark image 610 is superimposed on the home screen 510, the second controller 93 executes the setting notification process. Specifically, the second controller 93 displays the third functional mark 603 on the home screen 510. Therefore, the operator can visually recognize the first training mark image 610 and the third functional mark 603 at the same time. Therefore, since it is possible to allow the operator to visually recognize the relationship between the first training mark image 610 and the third functional mark 603, it is possible to enhance the learning effect.

In addition, according to the present embodiment, the first training mark image 610 indicates a mark that enlarges the third functional mark 603. Therefore, the operator can easily recognize the first training mark image 610. Therefore, it is possible to enhance the learning effect.

In addition, according to the present embodiment, the first training mark image 610 is displayed at the center of the home screen 510 and the center of the guidance screen 520. Therefore, the operator can easily recognize the first training mark image 610. Therefore, it is possible to enhance the learning effect.

In addition, according to the present embodiment, the first training mark image 610 is displayed in a region not overlapping the third functional mark 603. Therefore, the operator can visually recognize the first training mark image 610 and the third functional mark 603 at the same time. Therefore, it is possible to enhance the learning effect.

Figure 10:
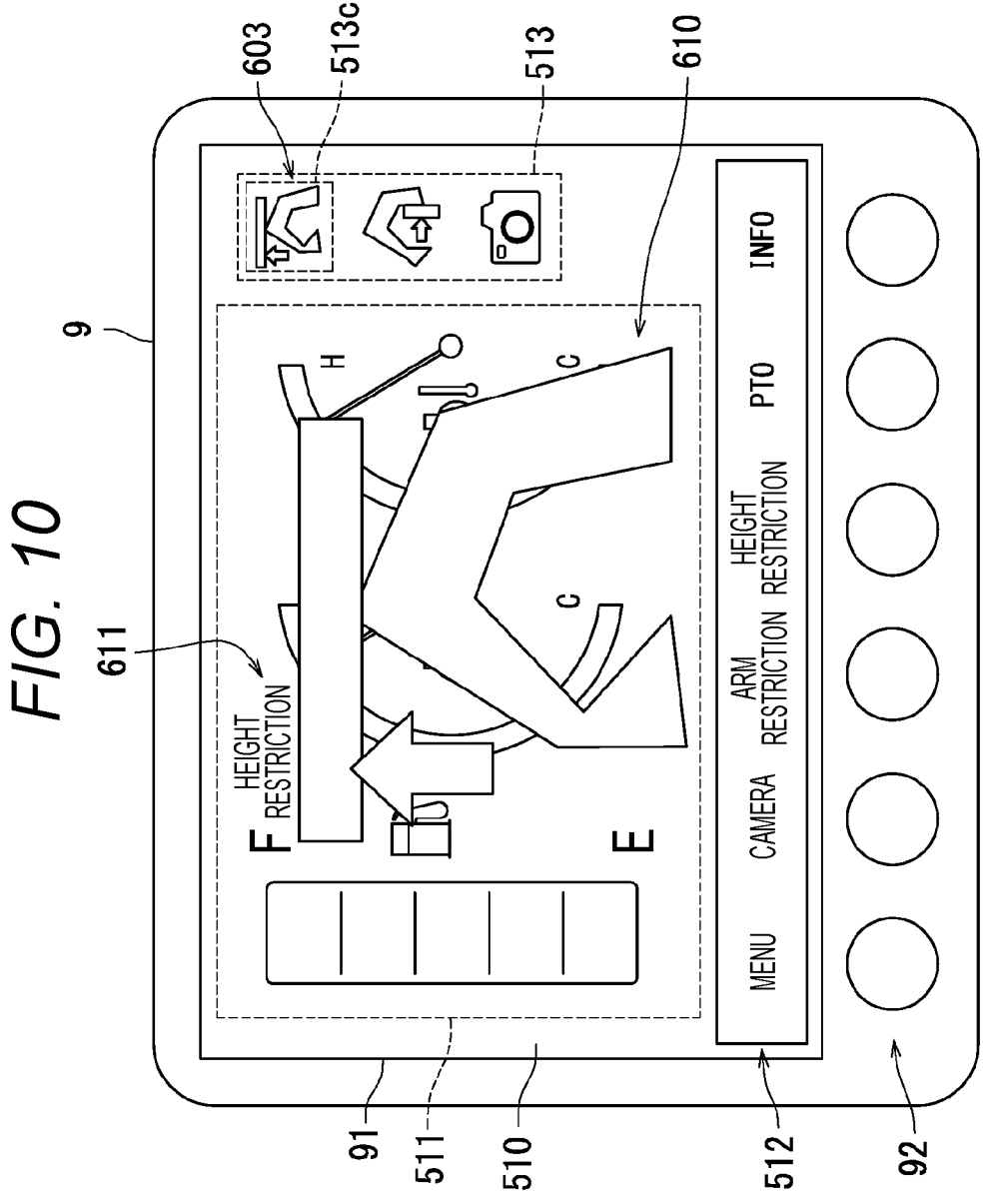
FIG. 10 is a diagram showing another example of the display device after an elapse of a certain period of time from the display of the first training mark image on the display unit.

Next, a first modification example of the working machine 1 of the present embodiment will be described with reference to FIG. 10. FIG. 10 is a diagram showing another example of the display device 9 after an elapse of a certain period of time from the display of the first training mark image 610 on the display unit 91.

In the working machine 1 described with reference to FIGS. 1 to 9, the setting notification process is a process of displaying the third functional mark 603 on the home screen 510 (see FIG. 7). However, the setting notification process is not limited to this process. For example, as shown in FIG. 10, the setting notification process may be a process of displaying the third functional mark 603 and the training message image 611 on the home screen 510.

The training message image 611 is a character string image indicating to which function of the working machine 1 the first training mark image 610 corresponds. By displaying the training message image 611, it is possible to allow the operator to learn which function of the working machine 1 the third functional mark 603 represents.

Figure 11:
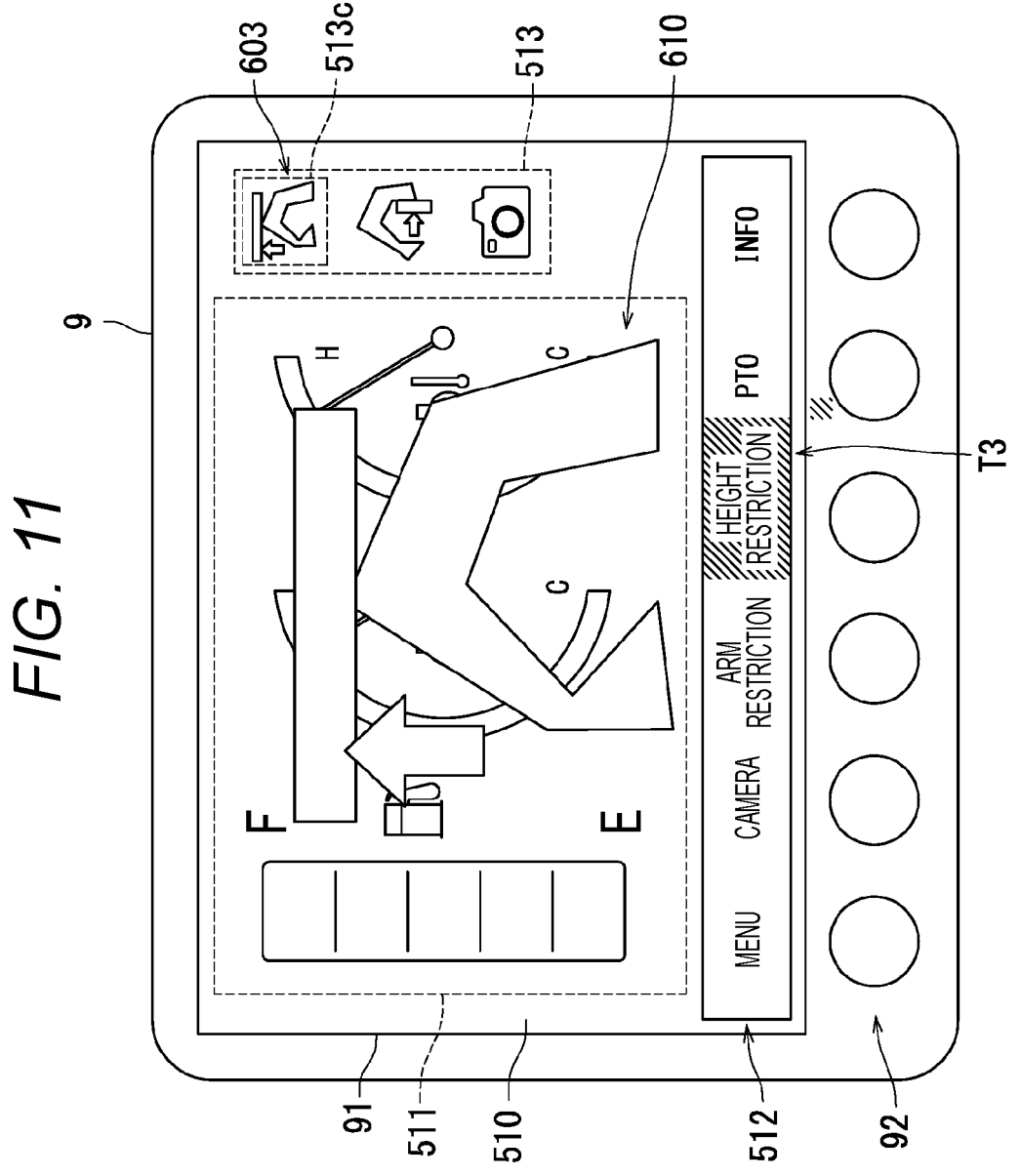
FIG. 11 is a diagram showing another example of the display device after an elapse of a certain period of time from the display of the first training mark image on the display unit.

Next, a second modification example of the working machine 1 of the present embodiment will be described with reference to FIG. 11. FIG. 11 is a diagram showing another example of the display device 9 after an elapse of a certain period of time from the display of the first training mark image 610 on the display unit 91.

As shown in FIG. 11, the setting notification process may be a process of displaying the third functional mark 603 on the home screen 510 and highlighting the selection item T3 "height restriction". By highlighting the selection item T3 "height restriction", it is possible to allow the operator to learn which function of the working machine 1 the third functional mark 603 represents.

Note that the selection item T3 "height restriction" may be lit or blink instead of highlighting the selection item T3 "height restriction". Alternatively, the selection item T3 "height restriction" may be colored.

Second Embodiment

Next, a second embodiment of the present invention will be described with reference to FIGS. 12 to 14. However, matters different from those in the first embodiment will be described, and the description of the same matters as those in the first embodiment will be omitted. In the second embodiment, unlike the first embodiment, a display device 9 displays a second training mark image 612.

Figure 12:
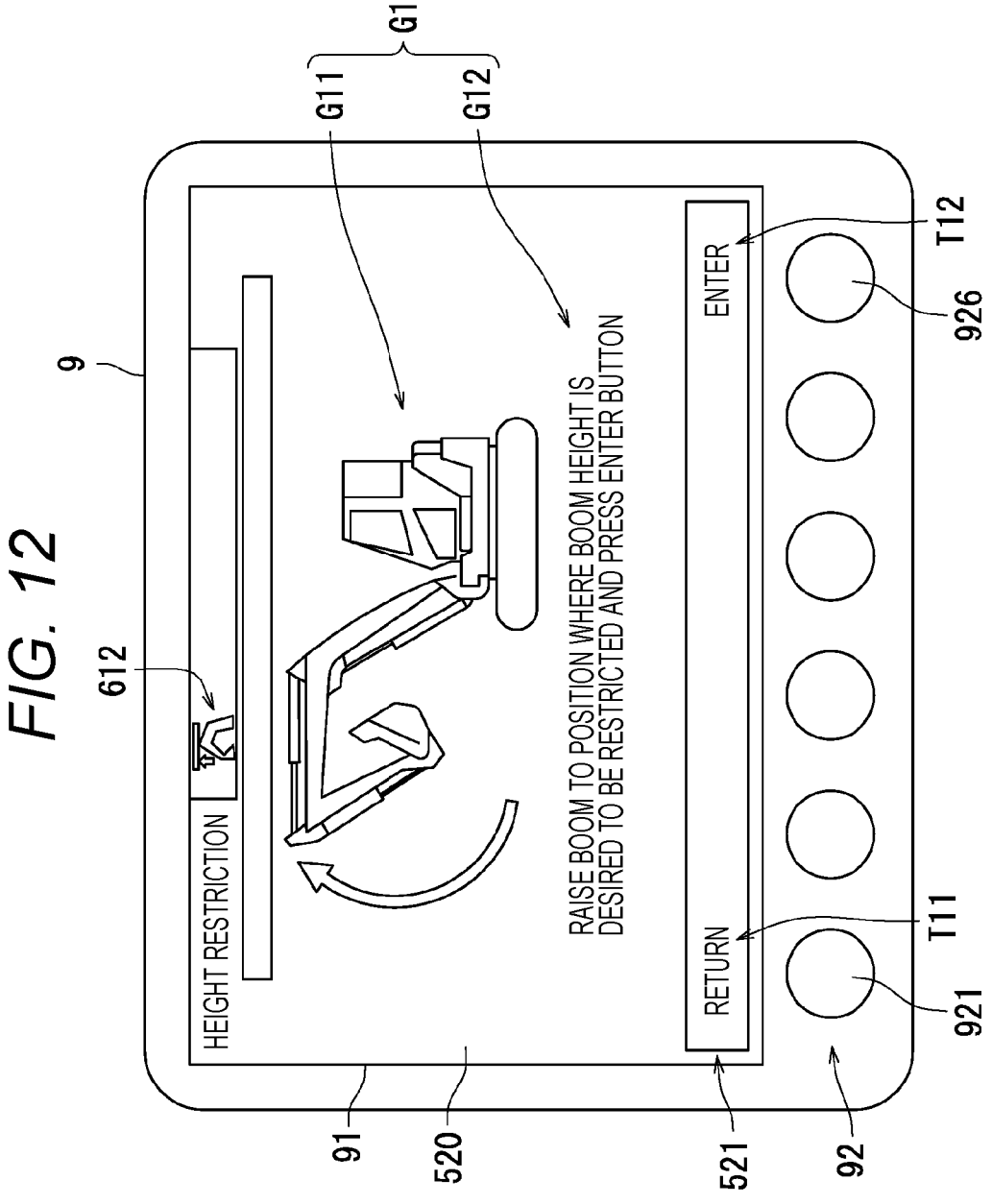
FIG. 12 is a diagram showing a display device in a working machine according to a second embodiment according to the present invention.

FIG. 12 is a diagram showing the display device 9 in a working machine 1 of the present embodiment. Specifically, FIG. 12 shows the display device 9 displaying a guidance screen 520.

As described with reference to FIG. 4, when the operator presses the fourth operation switch 924 while a display unit 91 is displaying a home screen 510, a second controller 93 causes the display unit 91 to display the guidance screen 520. In the present embodiment, when the screen to be displayed on the display unit 91 is caused to transition from the home screen 510 to the guidance screen 520, the second controller 93 causes the display unit 91 to display the second training mark image 612. The second training mark image 612 is an example of the second mark.

Specifically, the second controller 93 causes the display unit 91 to display the second training mark image 612 such that the second training mark image 612 is superimposed on the upper part of the guidance screen 520. Specifically, the second controller 93 displays the second training mark image 612 above a first guidance image G1.

The second training mark image 612 corresponds to the third functional mark 603 described with reference to FIG. 7. The size of the second training mark image 612 is not specifically limited as long as the size is within an area above the first guidance image G1 on the guidance screen 520. The size of the second training mark image 612 may be the same size as the third functional mark 603 or may be smaller than the third functional mark 603. Alternatively, the size of the second training mark image 612 may be larger than the size of the third functional mark 603.

Next, the display device 9 in the working machine 1 of the present embodiment will be further described with reference to FIG. 13. FIG. 13 is a diagram showing the display device 9 after the operation unit 92 receives an instruction to set the boom height restriction function.

Figure 13:
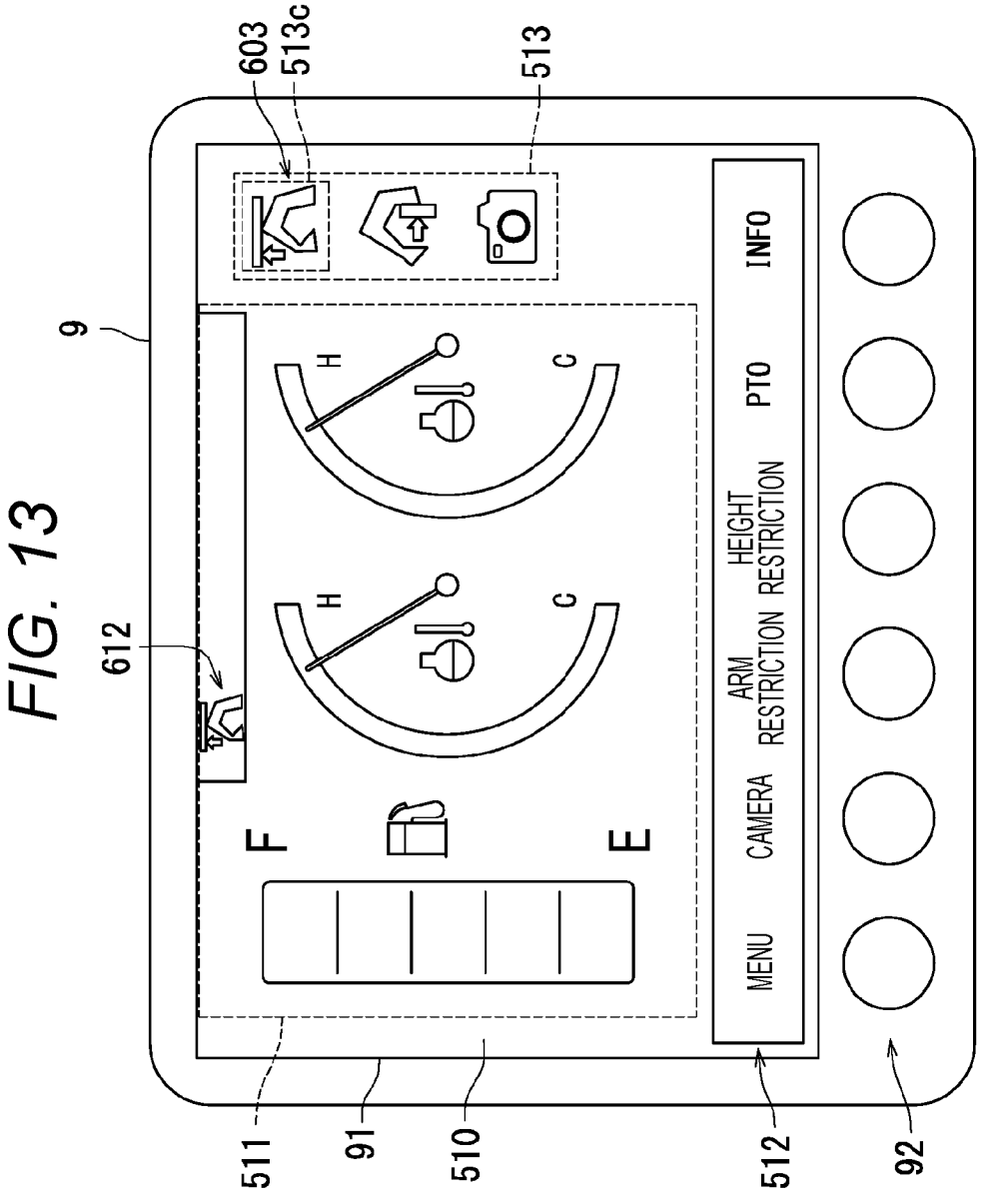
FIG. 13 is a diagram showing the display device after an operation unit receives an instruction to set a boom height restriction function.

As shown in FIG. 13, when the operation unit 92 receives an instruction to set the boom height restriction function, the second controller 93 causes the display unit 91 to display the home screen 510 instead of the guidance screen 520 while causing the display unit 91 to display the second training mark image 612. In other words, the second controller 93 causes the screen displayed on the display unit 91 to transition from the guidance screen 520 to the home screen 510. As a result, the second training mark image 612 is superimposed on the home screen 510. In the present embodiment, the second training mark image 612 is superimposed on the upper part of the home screen 510. Specifically, the second training mark image 612 is superimposed on the upper part of a main display area 511.

Note that in the working machine 1 of the second embodiment, the second controller 93 executes the setting notification process similarly to the first embodiment. Specifically, the second controller 93 displays the third functional mark 603 on the home screen 510.

Next, a process executed by the second controller 93 will be described with reference to FIGS. 12 to 14. FIG. 14 is a flowchart showing a process executed by the second controller 93 in the working machine 1. Specifically, FIG. 14 shows a process executed by the second controller 93 in response to selection of the selection item T3 "height restriction" while the home screen 510 is displayed. That is, FIG. 14 shows a process executed by the second controller 93 in response to pressing of the fourth operation switch 924 while the home screen 510 is displayed on the display unit 91.

Figure 14:
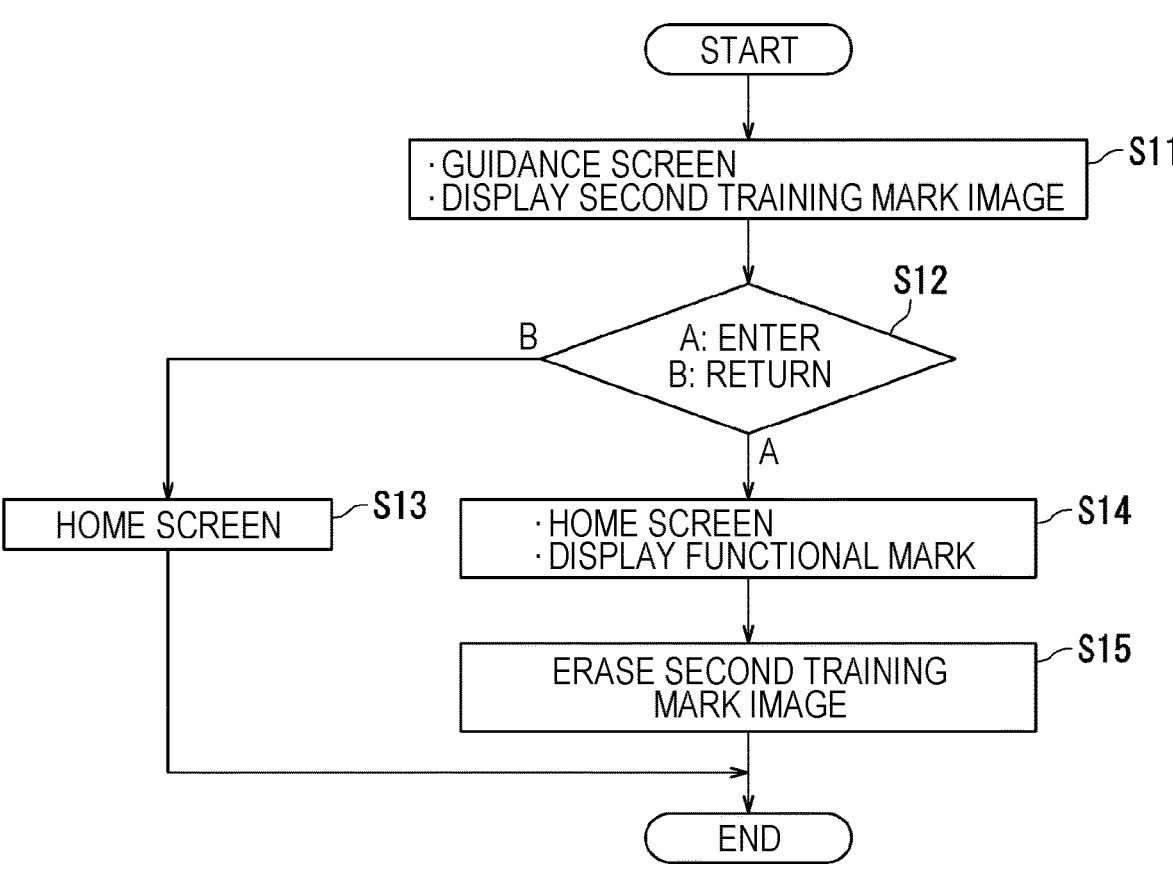
FIG. 14 is a flowchart showing a process executed by a second controller in the working machine.

As shown in FIG. 14, when the fourth operation switch 924 is pressed while the home screen 510 is displayed on the display unit 91, the second controller 93 causes the display unit 91 to display the guidance screen 520 and the second training mark image 612, and superimposes the second training mark image 612 on the guidance screen 520 (Step S11).

After displaying the guidance screen 520 and the second training mark image 612 on the display unit 91, the second controller 93 waits until the operator selects one of the selection item T11 "return" and the selection item T12 "enter" (Step S12).

When the operator presses the first operation switch 921 to select the selection item T11 "return" (B in Step S12), the second controller 93 causes the display unit 91 to display the home screen 510 (Step S13), and ends the process shown in FIG. 14.

When the operator presses a sixth operation switch 926 and selects the selection item T12 "enter" (A in Step S12), the second controller 93 causes the display unit 91 to display the home screen 510 instead of the guidance screen 520 while displaying the second training mark image 612, and superimposes the second training mark image 612 on the home screen 510 (Step S14). Furthermore, the second controller 93 displays the third functional mark 603 in a third mark display area 513*c* (Step S14).

Subsequently, after an elapse of a certain period of time from the superimposing of the second training mark image 612 on the home screen 510, the second controller 93 erases the second training mark image 612 from the display unit 91 (Step S15), and ends the process shown in FIG. 14.

As described above, the second embodiment of the present invention has been described above with reference to FIGS. 12 to 14. According to the present embodiment, the second training mark image 612 is superimposed on the guidance screen 520. The second training mark image 612 corresponds to the third functional mark 603. Therefore, similarly to the first embodiment, it is possible to allow the operator to learn the meaning of the third functional mark 603.

In addition, according to the present embodiment, the second training mark image 612 is displayed on the display unit 91 from the start of display of the guidance screen 520. Therefore, when the operator performs an operation to restrict the height of the boom 3 following the guidance screen 520, it is possible to superimpose the second training mark image 612 on the guidance screen 520. Therefore, since it is possible to allow the operator to visually recognize the second training mark image 612 for a longer time, it is possible to enhance the learning effect.

Third Embodiment

Next, a third embodiment of the present invention will be described with reference to FIGS. 4 and 15 to 17. However, matters different from the first and second embodiments will be described, and the description of the same matters as the first and second embodiments will be omitted. The third embodiment is different from the first and second embodiments in that a first training mark image 610 is displayed on a display unit 91 when the boom height restriction function set in a working machine 1 is disabled.

Figure 15:
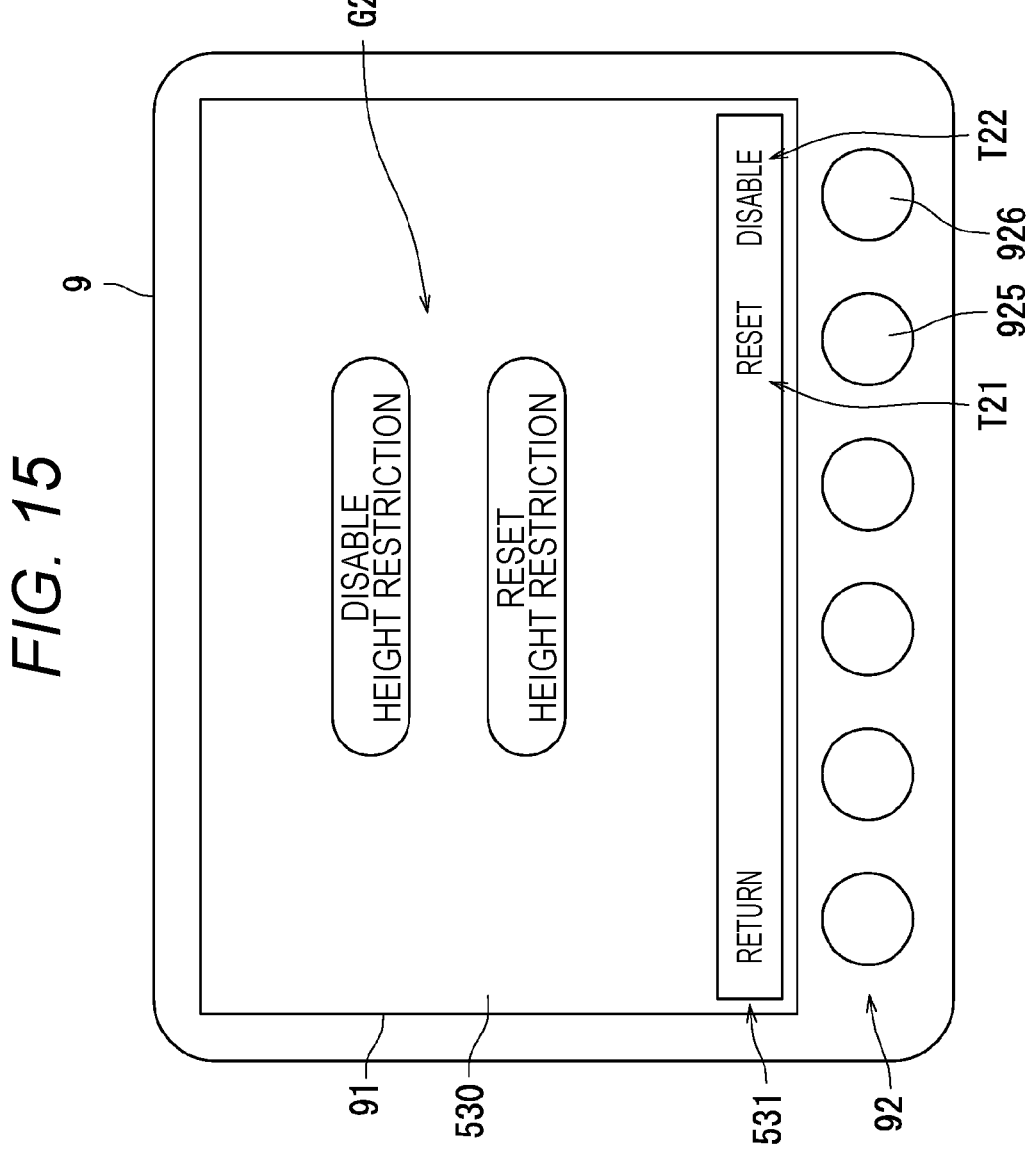
FIG. 15 is a diagram showing a display device in a working machine according to a third embodiment of the present invention.

FIG. 15 is a diagram showing a display device 9 in the working machine 1 of the present embodiment. Specifically, FIG. 15 shows the display device 9 displaying a selection screen 530. The selection screen 530 is a screen that allows the operator to select whether to disable the function set in the working machine 1 or to reset the function set in the working machine 1. In the present embodiment, the selection screen 530 is a screen that allows the operator to select whether to disable the setting of the boom height restriction function or to reset the boom height restriction function. Selection screen 530 is an example of a third screen.

As shown in FIG. 15, the selection screen 530 displays a second guidance image G2. The second guidance image G2 is an image that guides the operator to an operation of disabling the function set in the working machine 1 and an operation of resetting the function set in the working machine 1. In the present embodiment, the second guidance image G2 is an image that guides the operator to an operation of disabling the setting of the boom height restriction function and an operation of resetting the boom height restriction function. For example, the second guidance image G2 may include a character string image indicating "disabling of height restriction" and a character string image indicating "resetting of height restriction".

As shown in FIG. 15, the selection screen 530 has a third selection item display area 531. The third selection item display area 531 displays various selection items. Specifically, a character image (character string image) indicating various selection items is displayed in the third selection item display area 531. In the present embodiment, a selection item T21 "reset" and a selection item T22 "disable" are displayed in the third selection item display area 531. The selection item T21 "redetermine" is an item selected when the function set in the working machine 1 is reset. The selection item T22 "disable" is an item selected when the function set in the working machine 1 is disabled. Specifically, the selection item T21 "redetermine" is an item selected when the boom height restriction function is reset. The selection item T22 "disable" is an item selected when the boom height restriction function is disabled.

In the case in which the display unit 91 displays the selection screen 530, a function of selecting the selection item T21 "reset" is allocated to a fifth operation switch 925. When the operator presses the fifth operation switch 925, a second controller 93 causes the display unit 91 to display a guidance screen 520 described in the first embodiment (see FIG. 5).

In the case in which the display unit 91 displays the selection screen 530, a function of selecting the selection item T22 "disable" is allocated to a sixth operation switch 926. When the operator presses the sixth operation switch 926, the boom height restriction function is disabled. As a result, the restriction on the height (maximum height) of the boom 3 is released.

Figure 16:
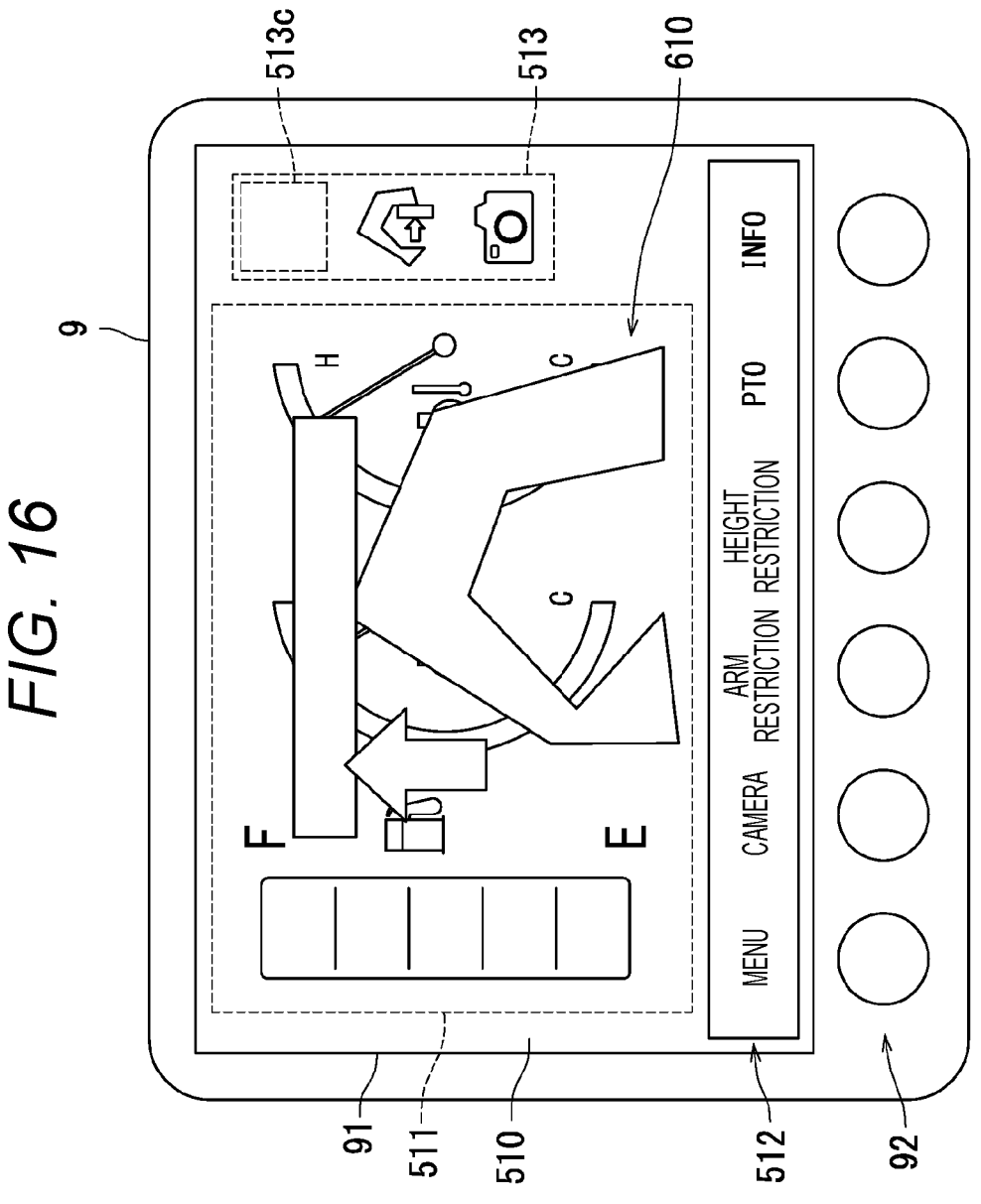
FIG. 16 is a diagram showing the display device after the operation unit receives an instruction to disable a boom height restriction function.

Subsequently, the display device 9 in the working machine 1 of the present embodiment will be further described with reference to FIG. 16. FIG. 16 is a diagram showing the display device 9 after an operation unit 92 receives an instruction to disable the boom height restriction function. In other words, FIG. 16 shows the display device 9 after the operator presses the sixth operation switch 926.

As shown in FIG. 16, the second controller 93 causes the display unit 91 to display a home screen 510 instead of the selection screen 530 in response to the reception of an instruction to disable the boom height restriction function by the operation unit 92. In other words, the second controller 93 transitions the screen to be displayed on the display unit 91 from the selection screen 530 to the home screen 510. In addition, the second controller 93 causes the display unit 91 to display the first training mark image 610 and superimposes the first training mark image 610 on the home screen 510 in response to the reception of an instruction to disable the boom height restriction function by the operation unit 92. In the present embodiment, the first training mark image 610 is superimposed on the center of the home screen 510.

In addition, the second controller 93 executes a disabling notification process when superimposing the first training mark image 610 on the home screen 510. The disabling notification process is a process of notifying on the home screen 510 that the boom height restriction function is disabled. In the present embodiment, the disabling notification process is a process of erasing a third functional mark 603 from the home screen 510. Therefore, as shown in FIG. 16, the third functional mark 603 is erased from a third mark display area 513c.

The second controller 93 erases the first training mark image 610 from the display unit 91 after an elapse of a certain period of time from the superposition of the first training mark image 610 on the home screen 510. As a result, as shown in FIG. 4, the home screen 510 is turned into a normal state.

Figure 17:
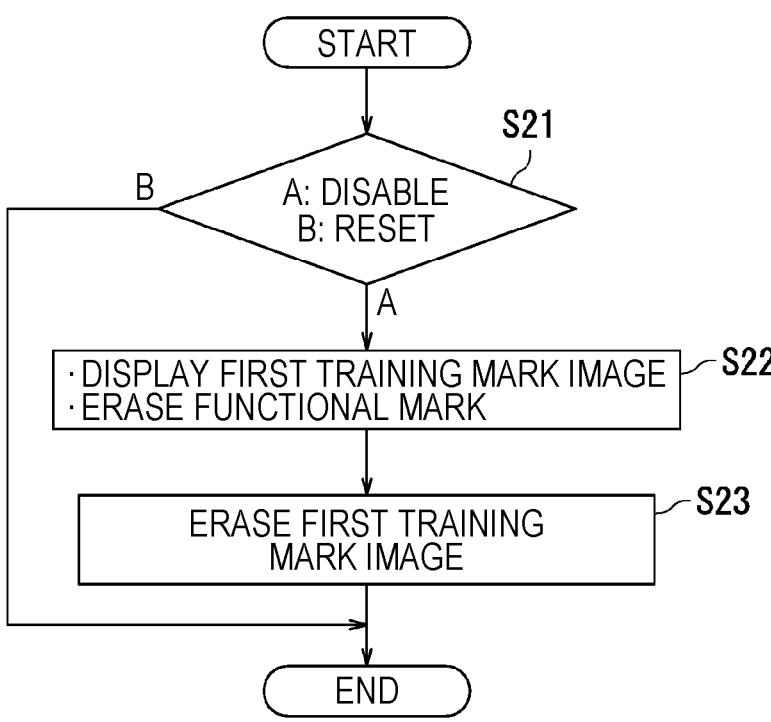
FIG. 17 is a flowchart showing a process executed by a second controller in the working machine.

Next, a process executed by the second controller 93 will be described with reference to FIGS. 4 and 15 to 17. FIG. 17 is a flowchart showing a process executed by the second controller 93 in the working machine 1.

As shown in FIG. 17, while the selection screen 530 is displayed on the display unit 91, the second controller 93 waits until the operator selects one of the selection item T21 "reset" and the selection item T22 "disable" (Step S21).

When the operator presses the fifth operation switch 925 to select the selection item T21 "reset" (B in Step S21), the second controller 93 ends the process shown in FIG. 17. Note that the second controller 93 executes the process described with reference to FIG. 9 after the process shown in FIG. 17 is ended by the operator pressing the fifth operation switch 925.

When the operator presses the sixth operation switch 926 and selects the selection item T22 "disable" (Ain Step S2), the second controller 93 causes the display unit 91 to display the home screen 510 instead of the selection screen 530, causes the display unit 91 to display the first training mark image 610, and superimposes the first training mark image 610 on the home screen 510 (Step S22). Furthermore, the second controller 93 erases the third functional mark 603 from the third mark display area 513c (Step S22).

Subsequently, after an elapse of a certain period of time from the superposition of the first training mark image 610 on the home screen 510, the second controller 93 erases the first training mark image 610 from the display unit 91 (Step S23), and ends the process shown in FIG. 17.

As described above, the third embodiment of the present invention has been described above with reference to FIGS. 4 and 15 to 17. According to the present embodiment, the first training mark image 610 is displayed when the boom height restriction function is disabled. Therefore, it is possible to allow the operator to learn the meaning of the third functional mark 603.

In addition, according to the present embodiment, when the first training mark image 610 is superimposed on the home screen 510, the second controller 93 executes the disabling notification process. Specifically, when the first training mark image 610 is superimposed on the home screen 510, the second controller 93 erases the third functional mark 603 from the home screen 510. Therefore, since it is possible to allow the operator to visually recognize the relationship between the first training mark image 610 and the third functional mark 603, it is possible to enhance the learning effect.

In addition, according to the present embodiment, the first training mark image 610 indicates a mark that enlarges the third functional mark 603. Therefore, the operator can easily recognize the first training mark image 610. Therefore, it is possible to enhance the learning effect.

In addition, according to the present embodiment, the first training mark image 610 is displayed at the center of the home screen 510. Therefore, the operator can easily recognize the first training mark image 610. Therefore, it is possible to enhance the learning effect.

Note that in the present embodiment, the first training mark image 610 is superimposed on the home screen 510. However, the second training mark image 612 described in the second embodiment may be superimposed on the home screen 510.

In addition, in the present embodiment, the second controller 93 executes the process described with reference to FIG. 9 after the process shown in FIG. 17 is ended by the operator pressing the fifth operation switch 925. However, the second controller 93 may execute the process described with reference to FIG. 14 after the process shown in FIG. 17 is ended by the operator pressing the fifth operation switch 925.

In addition, in the present embodiment, the disabling notification process is a process of erasing the third functional mark 603 from the home screen 510. However, the disabling notification process is not limited to this process. For example, the disabling notification process may be a process of erasing the third functional mark 603 from the home screen 510 and displaying the training message image 611 (see FIG. 10) on the home screen 510. Alternatively, the disabling notification process may be a process of erasing ting the third functional mark 603 from the home screen 510 and highlighting the selection item T3 "height restriction" (see FIG. 11).

In addition, in the present embodiment, the third functional mark 603 is erased in the disabling notification process. However, the disabling notification process may be a process of blinking the third functional mark 603 or a process of lighting the third functional mark 603. Alternatively, the third functional mark 603 may be colored. In the case in which the third functional mark 603 is not erased in the disabling notification process, the second controller 93 erases the third functional mark 603 from the home screen 510 after an elapse of a certain period of time from the superposition of the first training mark image 610 on the home screen 510.

The embodiments of the present invention have been described above with reference to the drawings (FIGS. 1 to 17). However, the present invention is not limited to the above embodiments, and can be implemented in various aspects without departing from the gist of the present invention. In addition, the plurality of constituent elements disclosed in the above embodiments can be appropriately modified. For example, a component of all components shown in an embodiment may be added to a component of another embodiment, or some components of all components shown in an embodiment may be deleted from an embodiment.

The drawings schematically show components mainly in order to facilitate understanding of the invention, and the thickness, length, number, interval, and the like of each shown components may be different from actual ones for convenience of drawing. In addition, the configuration of the components shown in the above embodiments is an example, and is not specifically limited, and it goes without saying that various modifications can be made without substantially departing from the effects of the present invention.

For example, referring to FIGS. 1 to 17, in the embodiment, the working machine 1 is a backhoe. However, the working machine 1 is not limited to the backhoe. The working machine 1 may be any machine that allows an operator to set functions through a screen.

In addition, in the embodiments with reference to FIGS. 1 to 17, the setting notification process includes a process of displaying the third functional mark 603. However, the setting notification process may not include a process of displaying the third functional mark 603. For example, in the setting notification process, the training message image 611 may be displayed without displaying the third functional mark 603. Alternatively, in the setting notification process, the selection item T3 "height restriction" may be highlighted without displaying the third functional mark 603. In the case in which the setting notification process does not include the process of displaying the third functional mark 603, the second controller 93 displays the third functional mark 603 on the home screen 510 after an elapse of a certain period of time from the superposition of the first training mark image 610 on the home screen 510.

Further, in the embodiments, the process executed by the second controller 93 when the boom height restriction function is set has been described with reference to FIGS. 1 to 17. However, even when a function other than the function of restricting the height of the boom 3 is set, it is possible to execute the similar process when the boom height restriction function is set. For example, when the arm position restriction function is set, the training mark image corresponding to the second functional mark 602 is displayed on the display unit 91, and it is possible to allow the operator to learn the meaning of the second functional mark 602.

Referring to FIGS. 1 to 17, in the embodiments, the operation unit 92 includes the plurality of operation switches (the first operation switch 921 to the sixth operation switch 926). However, the operation unit 92 is not limited to the plurality of operation switches. For example, the operation unit 92 may include a touch sensor. The touch sensor may be superimposed on the display surface of the display unit 91. Alternatively, the operation unit 92 may include a jog dial.

In addition, in the embodiments described with reference to FIGS. 1 to 17, the second controller 93 executes the processes shown in FIGS. 9, 14, and 17. However, the first controller 11 may execute the processes shown in FIGS. 9,

14, and 17, or the first controller 11 and the second controller 93 may execute the processes shown in FIGS. 9, 14, and 17 in cooperation with each other.

INDUSTRIAL APPLICABILITY

The present invention is useful for a working machine.

LIST OF REFERENCE SIGNS

1 Working machine
9 Display device
91 Display unit
92 Operation unit
93 Second controller
510 Home screen
520 Guidance screen
530 Selection screen
603 Third functional mark
610 First training mark image
611 Training message image
612 Second training mark image

The invention claimed is:

1. A working machine comprising:
a display unit that displays a first screen displaying a first mark indicating a set function and a second screen that sets the function;
a reception unit that receives an instruction to set the function when the display unit displays the second screen; and
a display processing unit that causes the display unit to display a second mark corresponding to the first mark and superimposes the second mark on the second screen when the display unit displays the second screen in response to reception of the instruction to set the function by the reception unit.

2. The working machine according to claim 1, wherein the display processing unit causes the display unit to display the first screen instead of the second screen while displaying the second mark, and superimposes the second mark on the first screen.

3. The working machine according to claim 2, wherein when the first screen is displayed instead of the second screen, the display processing unit executes a setting notification process of notifying, on the first screen, that the function is set.

4. The working machine according to claim 3, wherein the setting notification process includes a process of displaying the first mark on the first screen.

5. The working machine according to claim 4, wherein the second mark is displayed in an area that does not overlap with the first mark.

6. The working machine according to claim 1, wherein the display processing unit superimposes the second mark on an upper part of the second screen.

7. The working machine according to claim 1, wherein the second mark indicates a mark that enlarges the first mark.

8. The working machine according to claim 7, wherein the display processing unit superimposes the second mark on a center of the second screen.

9. The working machine according to claim 1, wherein the display unit further displays a third screen that disables the set function,
the reception unit receives an instruction to disable the function while the display unit is displaying the third screen, and the display processing unit causes the display unit to display the first screen instead of the third screen and display the second mark to superimpose the second mark on the first screen in response to reception of the instruction to disable the function by the reception unit.

10. The working machine according to claim 9, wherein when the second mark is superimposed on the first screen, the display processing unit executes a disabling notification process of notifying, on the first screen, that the function is disabled.

11. The working machine according to claim 10, wherein the disabling notification process includes a process of erasing the first mark from the first screen.

\* \* \* \* \*